(12) United States Patent
Rapaka et al.

(10) Patent No.: US 10,212,434 B2
(45) Date of Patent: Feb. 19, 2019

(54) PALETTE ENTRIES CODING IN VIDEO CODING

(71) Applicant: QUALCOMM Incorporated, San Diego, CA (US)

(72) Inventors: Krishnakanth Rapaka, San Diego, CA (US); Rajan Laxman Joshi, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 230 days.

(21) Appl. No.: 15/009,650

(22) Filed: Jan. 28, 2016

(65) Prior Publication Data

US 2016/0227226 A1   Aug. 4, 2016

Related U.S. Application Data

(60) Provisional application No. 62/110,221, filed on Jan. 30, 2015.

(51) Int. Cl.
| | |
|---|---|
| *H04N 19/186* | (2014.01) |
| *H04N 19/70* | (2014.01) |
| *H04N 19/593* | (2014.01) |
| *H04N 19/11* | (2014.01) |
| *H04N 19/182* | (2014.01) |

(Continued)

(52) U.S. Cl.
CPC ......... *H04N 19/186* (2014.11); *H04N 19/103* (2014.11); *H04N 19/11* (2014.11); *H04N 19/13* (2014.11); *H04N 19/132* (2014.11); *H04N 19/182* (2014.11); *H04N 19/44* (2014.11); *H04N 19/52* (2014.11); *H04N 19/593* (2014.11); *H04N 19/70* (2014.11); *H04N 19/91* (2014.11)

(58) Field of Classification Search
None
See application file for complete search history.

(56) References Cited

U.S. PATENT DOCUMENTS

| | | |
|---|---|---|
| 5,930,390 A | 7/1999 | Coelho |
| 7,343,037 B1 | 3/2008 | Kadatch |

(Continued)

FOREIGN PATENT DOCUMENTS

WO    2015086718 A2    6/2015

OTHER PUBLICATIONS

Wiegand et al., "WD1: Working raft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Zhihan Zhou
(74) *Attorney, Agent, or Firm* — Shumaker & Sieffert, P.A.

(57) ABSTRACT

A device for coding video data includes a memory storing video data and a video coder including one or more processors configured to determine a current coding unit of the video data is coded in a palette mode; determine a palette for the coding unit by, for a first entry of the palette, choosing a predictor sample from a reconstructed neighboring block of the coding unit and coding a difference between one or more color values of the first entry and one or more color values of the predictor sample.

28 Claims, 10 Drawing Sheets

(51) Int. Cl.
*H04N 19/103* (2014.01)
*H04N 19/13* (2014.01)
*H04N 19/132* (2014.01)
*H04N 19/44* (2014.01)
*H04N 19/52* (2014.01)
*H04N 19/91* (2014.01)

(56) References Cited

U.S. PATENT DOCUMENTS

| | | | |
|---|---|---|---|
| 9,558,567 | B2 | 1/2017 | Guo et al. |
| 2014/0267283 | A1 | 9/2014 | Nystad et al. |
| 2015/0016501 | A1 | 1/2015 | Guo et al. |
| 2015/0186100 | A1 | 7/2015 | Tsai et al. |
| 2015/0264365 | A1 | 9/2015 | Tsai et al. |
| 2016/0286217 | A1 | 9/2016 | Hsiang |
| 2016/0309172 | A1* | 10/2016 | Laroche ............... H04N 19/593 |
| 2016/0309183 | A1* | 10/2016 | Sun ..................... H04N 19/593 |
| 2016/0323591 | A1 | 11/2016 | Chuang et al. |
| 2017/0171560 | A1* | 6/2017 | Kim ..................... H04N 19/593 |

OTHER PUBLICATIONS

Wiegand et al., "WD2: Working raft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working raft 3 of High-Efficiency Video Coding," Document JCTVC-E603, 5th Meeting: Geneva, CH, Mar. 16-23, 2011, (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Shimizu, et al., "Description of 3D Video Coding Technology Proposal by NTT," MPEG Meeting; Nov. 28-Dec. 2, 2011; Geneva; (Motion Picture Expert Group or ISO/IEC JTC1/SC29/WG11), No. m22616, Nov. 27, 2011, 45 pp.

Zhu, et al., "Template-based palette prediction," JCT-VC Meeting; Apr. 18-26, 2013; Vienna; (Joint Collaborative Team on Video Coding of ISO/IEC JTC1/SC29/WG11 and ITU-TSG.16); URL: http://wftp3.itu.int/av-arch/jctvc-site/, No. JCTVC-N0169, Jul. 15, 2013, 3 pp.

ITU-T H.223, Series H: Audiovisual and Multimedia Systems, Infrastructure of audiovisual services—Transmission multiplexing and synchronization, Multiplexing protocol for low bit rate multimedia communication;The International Telecommunication Union. Jul. 2001, 74 pp.

Wang, et al., "High Efficiency Video Coding (HEVC) Defect Report 2," JCT-VC Meeting; Oct. 23-Nov. 1, 2013; (Joint Collaborative Team on Video Coding of ISO/IEC JTC1/SC29/WG11 and ITU-T SG.16); document No. JCTVC-O1003_v2, Nov. 24, 2013; 311 pp.

Flynn, et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16); document No. JCTVC-Q1005_v4, Apr. 10, 2014; 379 pp.

Wang, et al., "High Efficiency Video Coding (HEVC) Defect Report 4," JCT-VC Meeting; Mar. 27-Apr. 4, 2014; (Joint Collaborative Team on Video Coding of ISO/IEC JTC1/SC29/WG11 and ITU-T SG.16); document No. JCTVC-Q1003 (v.1); May 28, 2014; 314 pp.

Joshi, et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/WG11 and ITU-T SG.16); document No. JCTVC-R1005_v3, Sep. 27, 2014; 366 pp.

International Search Report and Written Opinion from International Application No. PCT/US2016/015717, dated Jun. 9, 2016, 16 pp.

Response to Written Opinion dated Jun. 9, 2016, from International Application No. PCT/US2016/015717, filed on Sep. 7, 2016, 5 pp.

Second Written Opinion from International Application No. PCT/US2016/015717, dated Jan. 2, 2017, 7 pp.

International Preliminary Report on Patentability—PCT/US2016/015717, The International Bureau of WIPO—Geneva, Switzerland, dated Apr. 5, 2017 12 pages.

Non-Final Office Action of U.S. Appl. No. 14/883,256 dated Nov. 14, 2017, 12 pages.

* cited by examiner

○ LUMA SAMPLE  ⊗ CHROMA SAMPLE

PALETTE ENTRIES CODING IN VIDEO CODING

This application claims the benefit of U.S. Provisional Patent Application No. 62/110,221 filed 30 Jan. 2015, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Aspects of this disclosure are related to palette mode coding for blocks of video data. The techniques described herein may be applied to any of various existing video codecs, such as codecs that comply with the High Efficiency Video Coding (HEVC) standard, extensions thereof, or any future video codecs.

In one example, a method of decoding video data includes determining a current coding unit of the video data is coded in a palette mode; determining a palette for the coding unit by for a first entry of the palette, choosing a predictor sample from a reconstructed neighboring block of the coding unit, decoding a difference between one or more color values of the first entry and one or more color values of the predictor sample, and based on the decoded residue data and the predictor sample, determining the first entry for the palette for the current coding unit; for a sample of the current coding unit, receiving an index value, wherein the index value identifies an entry from the palette; assigning one or more color values associated with the first entry to the sample to determine a reconstructed coding unit; and outputting a picture of decoded video data comprising the reconstructed coding unit.

In another example, a method of encoding video data includes determining a current coding unit of the video data is coded in a palette mode; determining a palette for the coding unit; for a first entry of the palette, choosing a predictor sample from a reconstructed neighboring block of the coding unit; determining a difference between one or more color values of the first entry and one or more color values of the predictor sample; and generating for inclusion in an encoded bitstream of video data one or more syntax elements indicating a difference between the one or more color values of the first entry and the one or more color values of the predictor sample.

In another example, a device for coding video data includes a memory storing video data and a video coder comprising one or more processors configured to determine a current coding unit of the video data is coded in a palette mode; determine a palette for the coding unit, wherein to determine the palette the one more processors are further configured to: for a first entry of the palette, choose a predictor sample from a reconstructed neighboring block of the coding unit; and code a difference between one or more color values of the first entry and one or more color values of the predictor sample.

In another example, a computer readable storage medium stores instructions that when executed by one or more processors cause the one or more processors to determine a current coding unit of video data is coded in a palette mode; determine a palette for the coding unit, wherein to determine the palette for the coding unit, the computer readable storage medium stores further instructions that when executed by one or more processors cause the one or more processors to: for a first entry of the palette, choose a predictor sample from a reconstructed neighboring block of the coding unit; and code a difference between one or more color values of the first entry and one or more color values of the predictor sample.

The details of one or more examples are set forth in the accompanying drawings and the description below. Other features, objects, and advantages will be apparent from the description and drawings, and from the claims.

DETAILED DESCRIPTION

This disclosure describes techniques for video coding (e.g. video encoding and video decoding) and compression. In particular, this disclosure describes techniques for palette-based video coding of video data. In palette-based video coding, a video coder (e.g., video encoder or video decoder) derives a palette table (also referred to simply as a "palette") for a block of pixels, where each entry in the palette table includes color values that are identified by indices into the palette table.

As part of coding a block in palette mode, the palette entries to be used for the block may first be coded. Then, palette indices for each pixel (or sample) of the block may be coded to indicate which entry from the palette should be used to predict or reconstruct the pixel (sample). This disclosure is generally directed to techniques for generating a palette, i.e., determining the palette entries of a palette.

As will be explained in greater detail below, a palette-mode coded block may be coded using either a predicted palette or a new palette. For a predicted palette, a video decoder receives only a few bits indicating that the palette to be used for a current block is a copy of a previously-used palette. For a new palette, a video decoder typically receives a larger amount of data than with a predicted palette because for a new palette the video decoder is not simply copying a previously-used palette but instead is generating a new palette. When generating a new palette, the video decoder generates the entries of the new palette entry by entry. For each entry, the video decoder receives a flag indicating if the entry is to be copied from an entry of the previous palette or if the entry is a new entry. According to existing techniques, for a new entry, the video decoder receives, for each component of the new entry, a color value. The color value is typically signaled at the bit depth used for the video data. Thus, to signal the luminance and two chrominance values for a palette entry of 8-bit video, the video decoder receives three 8-bit values.

According to the techniques of this disclosure, in order to reduce the bits needed for signaling new entries, the video decoder may locate a reconstructed sample and use the color values of the reconstructed sample as predictors for the new palette entry. Thus, instead of receiving three 8-bit values indicating the color values for the new palette entry, the video decoder may instead receive residue data indicating the difference between the color values for the new palette and the predictor sample. As the difference between the predictor sample and the color values of the new palette entry may frequently be less than the color values themselves, the difference may be able to be signaled using fewer bits than is needed for signaling the color values directly. By reducing the number of bits needed to signal new entries of a new palette, the overall coding efficiency of palette-mode coding may be improved.

Figure 1:
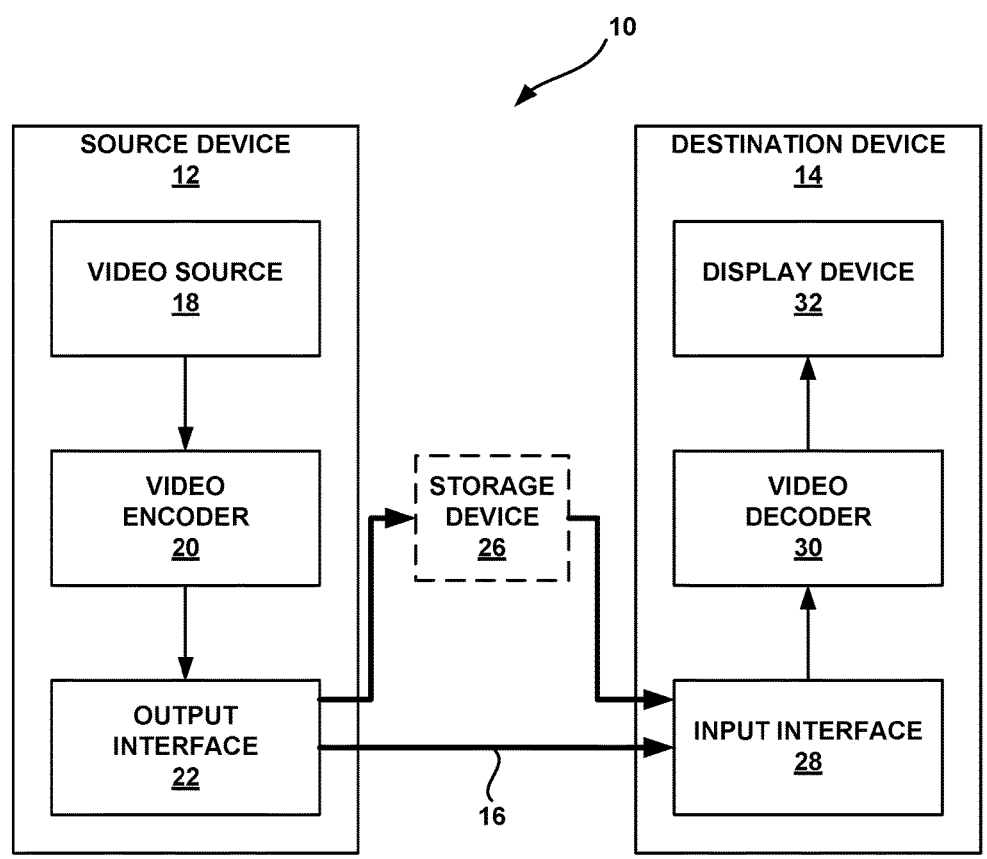
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM).

Video encoder 20 and video decoder 30 may also operate according to other proprietary or industry standards, such as the ITU-T H.264 standard, alternatively referred to as MPEG-4, Part 10, Advanced Video Coding (AVC), or extensions of such standards in addition to HEVC. The techniques of this disclosure, however, are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions, and other future codec designs and standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction, inter prediction, or another coding mode such as palette coding to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As introduced above, extensions to HEVC and other coding standards may implement coding modes other than intra and inter prediction. One such coding mode is palette mode, in which video encoder 20 and video decoder 30 may both derive a palette for a block of pixels, where each entry in the palette table includes color values that are identified by indices into the palette table. Video encoder 20 may then encode for the samples of the palette mode encoded block index values indicating which entry of the palette corresponds to the color values for the various samples of the block. Video decoder 30 receives the index values and, based on the index values, reconstructs the block.

Figure 2:
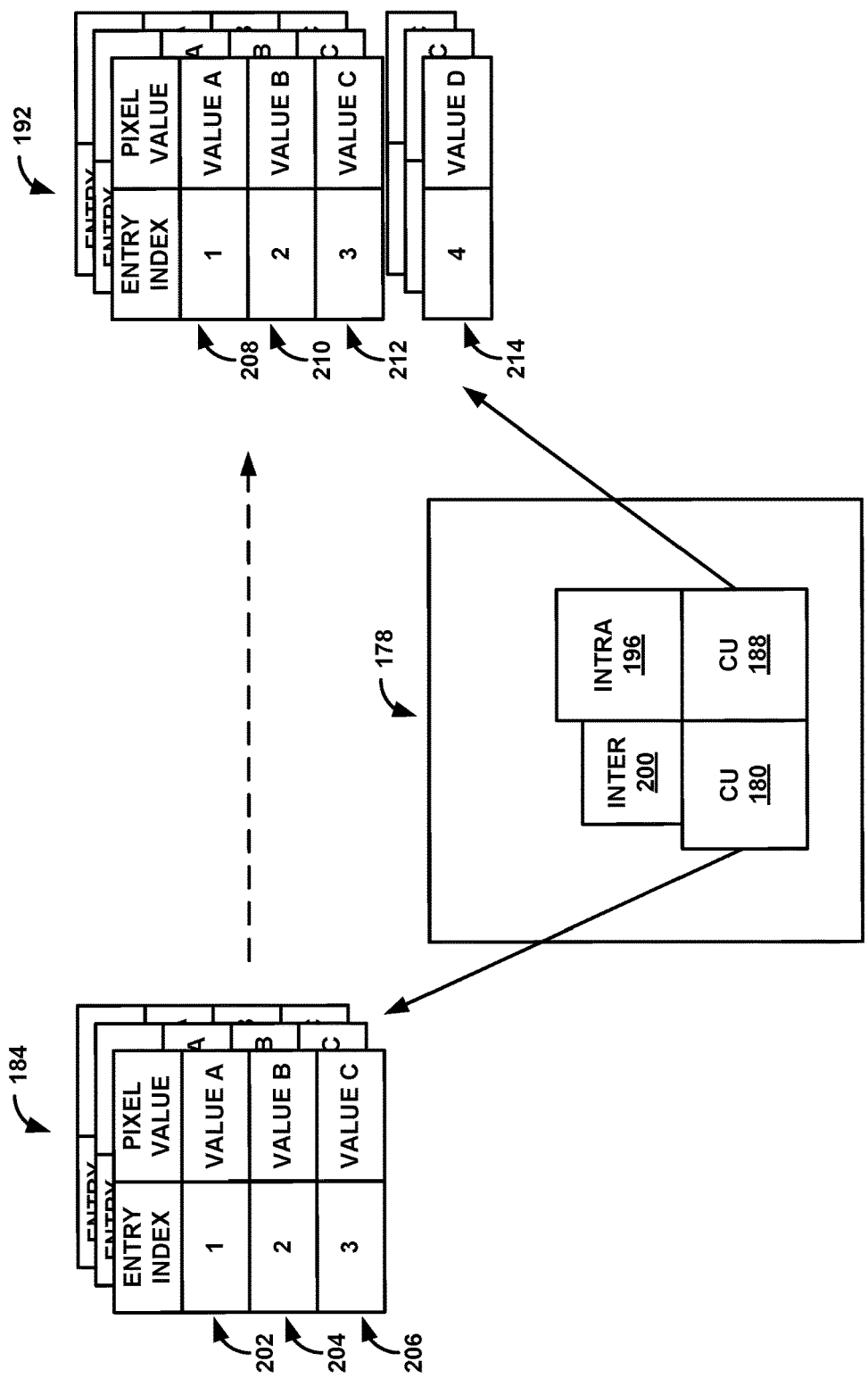
FIG. 2 is a conceptual diagram illustrating an example of determining a palette for coding video data, consistent with techniques of this disclosure.

FIG. 2 is a conceptual diagram illustrating an example of determining a palette for coding video data, consistent with techniques of this disclosure. The example of FIG. 2 includes a picture 178 having a first coding unit (CU) 180 that is associated with a first set of palettes (i.e., first palettes 184) and a second CU 188 that is associated with a second set of palettes (i.e., second palettes 192). As described in greater detail below and in accordance with one or more of the techniques of this disclosure, second palettes 192 are based on first palettes 184. Picture 178 also includes block 196 coded with an intra-prediction coding mode and block 200 that is coded with an inter-prediction coding mode.

Figure 6:
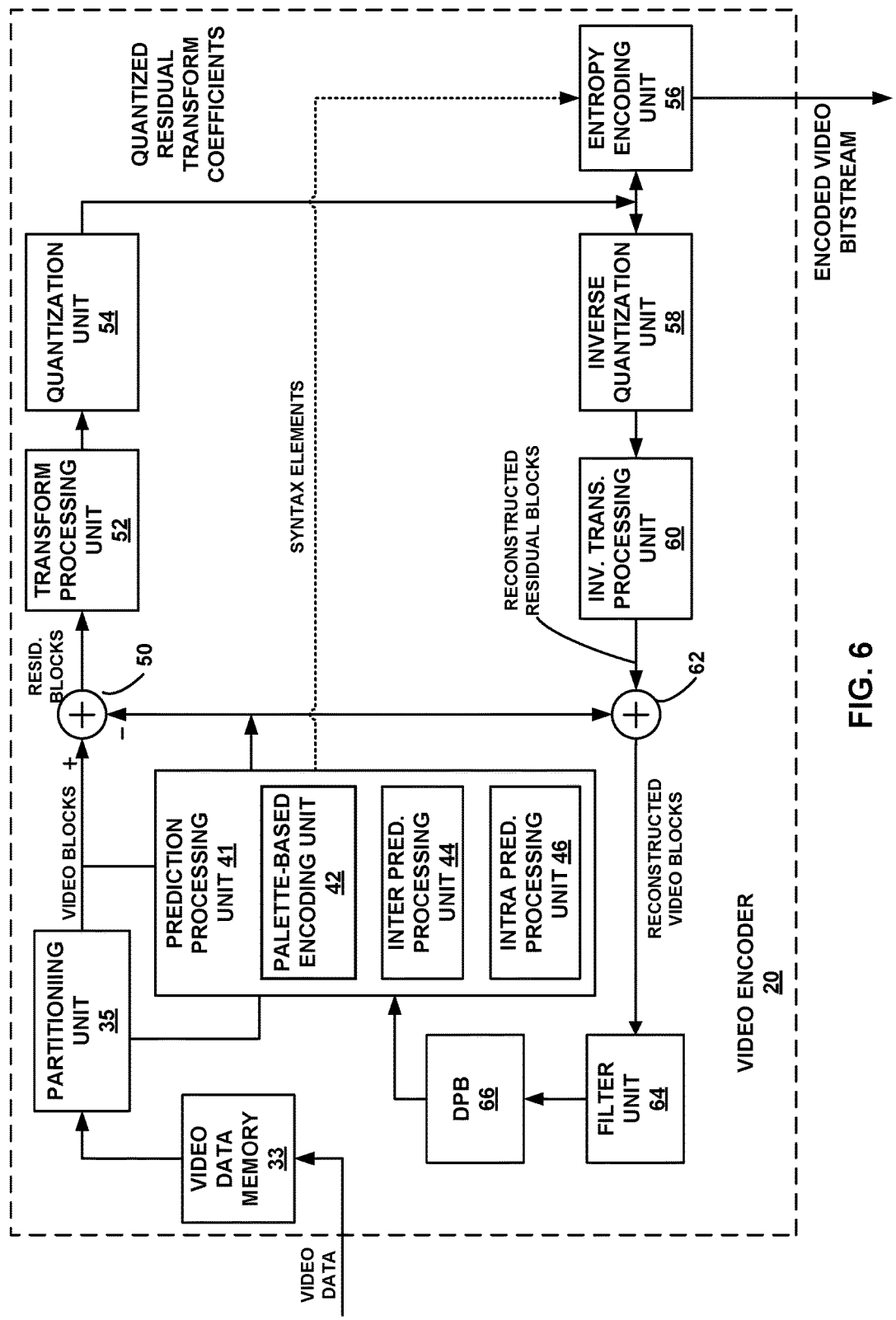
FIG. 6 is a block diagram illustrating an example video encoder that may implement the techniques described in this disclosure.

The techniques of FIG. 2 are described in the context of video encoder 20 (FIG. 1 and FIG. 6 and video decoder 30 (FIG. 1 and FIG. 7) and with respect to the HEVC video coding standard for purposes of explanation. With respect to the HEVC framework, as an example, the palette-based coding techniques may be configured to be used as a CU mode. In other examples, the palette-based coding techniques may be configured to be used as a PU mode or a TU mode in the framework of HEVC. Accordingly, all of the following disclosed processes described in the context of a CU mode may, additionally or alternatively, apply to a PU or a TU. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded (e.g., CU 188 in the example of FIG. 2). First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including $Y_i$, $U_i$, and $V_i$. In this case, each entry in the palette includes values for each of the components of the pixels. Accordingly, the representation of palettes 184 and 192 as a set of palettes having multiple individual palettes is merely one example and not intended to be limiting. Except where stated to the contrary, the techniques described below with respect to FIG. 2 are equally applicable to palettes that use triple values as they are to palettes that use single values.

In the example of FIG. 2, each of first palettes 184 includes three entries 202-206 having entry index value 1, entry index value 2, and entry index value 3, respectively. Entries 202-206 relate the index values to pixel values including pixel value A, pixel value B, and pixel value C, respectively. It should be noted that each of first palettes 184 do not actually include the indices and column headers, but only include the pixel values A, B and C and the indices are used to identify the entries in the palette.

As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and may reconstruct the pixel values using the index values and one or more of first palettes 184. In other words, for each respective index value for a block, video decoder 30 may determine an entry in one of first palettes 184. Video decoder 30 may replace the respective index value in the block with the pixel value specified by the determined entry in the palette. Video encoder 20 may transmit first palettes 184 in an encoded video data bitstream for use by video decoder 30 in palette-based decoding. In general, one or more palettes may be transmitted for each CU or may be shared among different CUs.

Video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palettes 192 for second CU 188 are included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate if the palette for a current CU is the same as a palette for a previous CU. If the value of pred_palette_flag is true, then second palettes 192 are identical to first palettes 184 and no additional information is signaled. In other examples, one or more syntax elements may be signaled on a per-entry basis. That is, a flag may be signaled for each entry of a palette predictor to indicate whether that entry is present in the current palette. As noted above, if a palette entry is not predicted, the palette entry may be explicitly signaled. In other examples, these two methods could be combined. For example, first the pred_palette_flag is signaled. If the flag is 0, a per-entry prediction flag may be signaled. In addition, the number of new entries and their explicit values may be signaled. As will be explained in greater detail below, according to the techniques of this disclosure, the values of new entries may be signaled as difference information between the actual values of the new entries and the values of a predictor sample.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictive palette. In some examples, such as the example illustrated in FIG. 2, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196. In another example, the palette for the last CU in scan order that used the palette mode may be used as a predictive palette.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 2 illustrates first palettes 184 as predictive palettes from a single CU, (i.e., first CU 180), in other examples, video encoder 20 and/or video decoder 30 may locate palettes for prediction from a combination of neighboring CUs. For example, video encoder 20 and/or video decoder may apply one or more formulas, functions, rules or the like to generate a predictive palette based on palettes of one or a combination of a plurality of neighboring CUs (spatially or in scan order).

In still other examples, video encoder 20 and/or video decoder 30 may construct a candidate list including a number of potential candidates for palette prediction. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU. In another example, the palette of the indicated candidate CU in the list may be used as a predictive palette for per-entry prediction of a current palette for the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction. In another example, the flag may indicate whether the palette of the top or left neighboring CU is used as a predictive palette. Then, for each entry in the predictive palette, it may be indicated whether that entry is used in the palette for the current CU.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

As noted above, in some examples, video encoder 20 and/or video decoder may copy an entire palette from a neighboring CU for coding a current CU. Additionally or alternatively, video encoder 20 and/or video decoder 30 may perform entry-wise based palette prediction. For example, video encoder 20 may encode one or more syntax elements for each entry of a palette indicating whether the respective entries are predicted based on a predictive palette (e.g., a palette of another CU). In this example, video encoder 20 may encode a flag having a value of one for a given entry when the entry is a predicted value from a predictive palette (e.g., a corresponding entry of a palette associated with a neighboring CU). Video encoder 20 may encode a flag having a value of zero for a particular entry to indicate that the particular entry is not predicted from a palette of another CU. In this example, video encoder 20 may also encode additional data indicating the value of the non-predicted palette entry.

This disclosure describes several alternative techniques for predicting a palette for a current CU. In one example, a predictive palette that includes palette entries from one or more previously coded neighboring CUs includes a number of entries, N. In this case, video encoder 20 first transmits a binary vector, V, having the same size as the predictive palette, i.e., size N, to video decoder 30. Each entry in the binary vector indicates whether the corresponding entry in the predictive palette will be reused or copied to the palette for the current CU. For example, V(i)=1 means that the i-th entry in the predictive palette for the neighboring CU will be reused or copied to the palette for the current CU, which may have a different index in the current CU.

In addition, video encoder 20 may transmit a number, M, that indicates how many new palette entries are included in the palette for the current CU, and then transmits a pixel value for each of the new palette entries to video decoder 30. In this example, the final size of the palette for the current CU may be derived as equal to M+S, where S is the number of entries in the predictive palette that may be reused or copied to the palette for the current CU (i.e., V(i)=1). To generate the palette for the current CU, video decoder 30 may merge the transmitted new palette entries and the copied palette entries reused from the predictive palette. In some cases, the merge may be based on the pixel values, such that the entries in the palette for the current CU may increase (or decrease) with the palette index. In other cases, the merge may be a concatenation of the two sets of entries, i.e., the new palette entries and the copied palette entries.

In another example, video encoder 20 first transmits an indication of a size of a palette, N, for a current CU to video decoder 30. Video encoder 20 then transmits a vector, V, having the same size as the palette for the current CU, i.e., size N, to video decoder 30. Each entry in the vector indicates whether the corresponding entry in the palette for the current CU is explicitly transmitted by video encoder 20 or copied from a predictive palette. For example, V(i)=1 means that video encoder 20 transmits the i-th entry in the palette to video decoder 30, and V(i)=0 means that the i-th entry in the palette is copied from the predictive palette. For the entries that are copied from the predictive palette (i.e., V(i)=0), video encoder 20 may use different methods to signal which entry in the predictive palette is used in the palette for the current CU. In some cases, video encoder 20 may signal the palette index of the entry to be copied from the predictive palette to the palette for the current CU. In other cases, video encoder 20 may signal an index offset, which is the difference between the index in the palette for the current CU and the index in the predictive palette.

In the two above examples, the one or more previously coded neighboring CUs used to generate the predictive palette used for prediction of the palette for the current CU may be a top-neighboring (i.e., upper) CU or a left-neighboring CU with respect to the current CU. In some examples, a candidate list of neighboring CUs may be constructed, and video encoder 20 transmits an index to indicate which candidate neighboring CUs and associated palettes are used for palette prediction for the current CU. For certain CUs, e.g., CUs that are positioned at a beginning of a slice or at other slice boundaries or leftmost CUs in the slice or a picture of video data, palette prediction may be disabled.

In an additional example, video encoder 20 transmits an indication of a number of entries included in a palette for a current CU to video decoder 30. Then, for each of the palette entries, video encoder 20 transmits a flag or other syntax element to indicate whether the palette entry is explicitly transmitted by video encoder 20 or whether it is derived from a previously reconstructed pixel. For example, a one-bit flag set equal to 1 may mean that video encoder 20 explicitly sends the palette entry, and the one-bit flag set equal to 0 may mean that the palette entry is derived from a previously reconstructed pixel. For each of the palette entries that are derived from a previously reconstructed pixel, video encoder 20 transmits another indication regarding a pixel location of the reconstructed pixel in the current CU or a neighboring CU that corresponds to the palette entry. In some cases, the reconstructed pixel location indication may be a displacement vector with respect to the top-left position of the current CU. In other cases, the reconstructed pixel location indication may be an index into a list of reconstructed pixels that can be used for specifying the palette entry for the current CU. For example, this list may include all the reference pixels that may be used for normal intra prediction in HEVC.

In the example of FIG. 2, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. According to one or more aspects of this disclosure, video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictive palette and the pixel values corresponding to those palette entries.

In some examples, according to aspects of this disclosure, one or more syntax elements may indicate whether palettes, such as second palettes 192, are predicted entirely from a predictive palette (shown in FIG. 2 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements), video encoder 20 and video decoder 30 may perform palette prediction based on one or more characteristics of the data being coded.

In an example, for purposes of illustration, the value of pred_palette_flag, described above, may be inferred from one or more of, as examples, the size of the CU being coded, the frame type, the color space, the color component, the frame size, the frame rate, the layer id in scalable video coding or the view id in multi-view coding. That is, with respect to the size of the CU as an example, video encoder 20 and/or video decoder 30 may determine that the above-described pred_palette_flag is equal to one for any CUs that exceed or are less than a predetermined size. In this example, the pred_palette_flag does not need to be signaled in the encoded bitstream.

While described above with respect to the pred_palette_flag, video encoder 20 and/or video decoder 30 may also or alternatively infer other information associated with palette prediction, such as the candidate CU from which the palette is used for prediction, or rules for constructing palette prediction candidates, based on one or more characteristics of the data being coded.

According to other aspects of this disclosure, video encoder 20 and/or video decoder 30 may construct a palette on-the-fly. For example, when initially coding second CU 188, there are no entries in palettes 192. As video encoder 20 and video decoder 30 code new values for pixels of second CU 188, each new value is included in palettes 192. That is, for example, video encoder 20 adds pixel values to palettes 192 as the pixel values are generated and signaled for positions in CU 188. As video encoder 20 encodes pixels relatively later in the CU, video encoder 20 may encode pixels having the same values as those already included in the palette using index values rather than signaling the pixel values. Similarly, when video decoder 30 receives a new pixel value (e.g., signaled by video encoder 20) for a position in second CU 188, video decoder 30 includes the pixel value in palettes 192. When pixel positions decoded relatively later in second CU 188 have pixel values that have been added to second palettes 192, video decoder 30 may receive information such as, e.g., index values, that identify the corresponding pixel values in second palettes 192 for reconstruction of the pixel values of second CU 188.

In some examples, as described in greater detail below, video encoder 20 and/or video decoder 30 may maintain palettes 184 and 192 at or below a maximum palette size. According to aspects of this disclosure, if a maximum palette size is reached, e.g., as second palettes 192 are constructed dynamically on-the-fly, then video encoder 20 and/or video decoder 30 perform the same process to remove an entry of second palettes 192. One example process for removing palette entries is a first-in-first-out (FIFO) technique in which video encoder 20 and video decoder 30 remove the oldest entry of a palette. In another example, video encoder 20 and video decoder 30 may remove the least frequently used palette entry from the palette. In still another example, video encoder 20 and video decoder 30 may weight both FIFO and frequency of use processes to determine which entry to remove. That is, removal of an entry may be based on how the old the entry is and how frequently it is used.

According to some aspects, if an entry (pixel value) is removed from a palette and the pixel value occurs again at a later position in the CU being coded, video encoder 20 may encode the pixel value instead of including an entry in the palette and encoding an index. Additionally or alternatively, video encoder 20 may re-enter palette entries into the palette after having been removed, e.g., as video encoder 20 and video decoder 30 scan the positions in the CU.

In some examples, the techniques for deriving a palette on-the-fly may be combined with one or more other techniques for determining a palette. In particular, as an example, video encoder 20 and video decoder 30 may initially code second palettes 192 (e.g., using palette prediction to predict second palettes 192 from first palettes 184) and may update second palettes 192 when coding pixels of second CU 188. For example, upon transmitting the initial palette, video encoder 20 may add values to the initial palette or change values in the initial palette as pixel values of additional locations in the CU are scanned. Likewise, upon receiving an initial palette, video decoder 30 may add (i.e., include) values to the initial palette or change values in the initial palette as pixel values of additional locations in the CU are scanned.

Video encoder 20 may, in some examples, signal whether the current CU uses transmission of an entire palette, or on-the-fly palette generation, or a combination of transmission of an initial palette with updating of the initial palette by on-the-fly derivation. In some examples, the initial palette may be a full palette at maximum palette size, in which case values in the initial palette may be changed. In other examples, the initial palette may be smaller than the maximum palette size, in which cases video encoder 20 and video decoder 30 may add values to and/or change values of the initial palette.

According to one or more aspects of this disclosure, the size of palettes, such as first palettes 184 and second palettes 192, e.g., in terms of the number of pixel values that are included in the palette may be fixed or may be signaled using one or more syntax elements in an encoded bitstream. For example, according to some aspects, video encoder 20 and video decoder 30 may use unary codes or truncated unary codes (e.g., codes that truncate at a maximum limit of the palette size) to code the palette size. According to other aspects, video encoder 20 and video decoder 30 may use Exponential-Golomb or Rice-Golomb codes to code the palette size.

According to still other aspects, video encoder 20 and video decoder 30 may code data indicating the size of the palette after each entry of the palette. With respect to second palettes 192 as an example, video encoder 20 may encode a stop flag after each of entries 208-214. In this example, a stop flag equal to one may specify that the entry currently being coded is the final entry of second palettes 192, while a stop flag equal to zero may indicate that there are additional entries in second palettes 192. Accordingly, video encoder 20 may encode stop flags having a value of zero after each of entries 208-212 and a stop flag having a value of one after entry 214. In some instances, the stop flag may not be included in the bitstream upon the constructed palette reaching a maximum palette size limit. While the examples above disclose techniques for explicitly signaling the size of palettes, in other examples, the size of palettes may also be conditionally transmitted or inferred based on so-called side information (e.g., characteristic information such as the size of the CU being coded, the frame type, the color space, the color component, the frame size, the frame rate, the layer id in scalable video coding or the view id in multi-view coding, as noted above).

The techniques of this disclosure include coding data losslessly, or, alternatively, with some losses (lossy coding). For example, with respect to lossy coding, video encoder 20 may code the pixels of a CU without exactly matching the pixel values of palettes exactly to the actual pixel values in the CU. When the techniques of this disclosure are applied to lossy coding, some restrictions may be applied to the palette. For example, video encoder 20 and video decoder 30 may quantize palettes, such as first palettes 184 and second palettes 192. That is, video encoder 20 and video decoder 30 may merge or combine (i.e., quantize) entries of a palette when the pixel values of the entries are within a predetermined range of each other. In other words, if there is already a palette value that is within an error margin of a new palette value, the new palette value is not added to the palette. In another example, a plurality of different pixel values in a block may be mapped to a single palette entry, or, equivalently, to a single palette pixel value.

Video decoder 30 may decode pixel values in the same manner, regardless of whether a particular palette is lossless or lossy. As one example, video decoder 30 may use an index value transmitted by video encoder 20 for a given pixel position in a coded block to select an entry in the palette for the pixel position, without regard to whether the palette is lossless or lossy. In this example, the pixel value of the palette entry is used as the pixel value in the coded block, whether it matches the original pixel value exactly or not.

In an example of lossy coding, for purposes of illustration, video encoder 20 may determine an error bound, referred to as a delta value. A candidate pixel value entry Plt_cand may correspond to a pixel value at a position in a block to be coded, such as CU or PU. During construction of the palette, video encoder 20 determines the absolute difference between the candidate pixel value entry Plt_cand and all of the existing pixel value entries in the palette. If all of the absolute differences between the candidate pixel value entry Plt_cand and the existing pixel value entries in the palette are larger than the delta value, video encoder 20 may add the pixel value candidate to the palette as an entry. If an absolute difference between the pixel value entry Plt_cand and at least one existing pixel value entry in the palette is equal to or smaller than the delta value, video encoder 20 may not add the candidate pixel value entry Plt_cand to the palette. Thus, when coding the pixel value entry Plt_cand, video encoder 20 may select the entry with the pixel value that is the closest to the pixel value entry Plt_cand, thereby introducing some loss into the system. When a palette consists of multiple components (e.g. three color components), the sum of absolute difference of individual component values may be used for comparison against the delta value. Alternatively or additionally, the absolute difference for each component value may be compared against a second delta value.

In some examples, the existing pixel value entries in the palette noted above may have been added using a similar delta comparison process. In other examples, the existing pixel values in the palette may have been added using other processes. For example, one or more initial pixel value entries may be added to a palette (without a delta comparison) to start the delta comparison process of constructing the palette. The process described above may be implemented by video encoder 20 and/or video decoder 30 to produce luma and/or chroma palettes.

The techniques described above with respect to palette construction may also be used by video encoder 20 and video decoder 30 during pixel coding. For example, when encoding of a pixel value, video encoder 20 may compare the value of the pixel with the pixel values of entries in the palette. If the absolute pixel value difference between the value of the pixel and one of the entries in the palette is equal to or smaller than a delta value, video encoder 20 may encode the pixel value as the entry of the palette. That is, in this example, video encoder 20 encodes the pixel value using one of the entries of the palette when the pixel value produces a sufficiently small (e.g., within a predetermined range) absolute difference versus the palette entry.

In some examples, video encoder 20 may select the palette entry that yields the smallest absolute pixel value difference (compared to the pixel value being coded) to encode the pixel value. As an example, video encoder 20 may encode an index to indicate a palette entry that will be used for the pixel value, e.g., the palette pixel value entry that will be used to reconstruct the coded pixel value at video decoder 30. If the absolute pixel value difference between the value of the pixel and all of the entries in the palette is greater than delta, the encoder may not use one of the palette entries to encode the pixel value, and instead may transmit the pixel value of the pixel (possibly after quantization) to video decoder 30 (and possibly add the pixel value as an entry to the palette).

In another example, video encoder 20 may select an entry of a palette for encoding a pixel value. Video encoder 20 may use the selected entry as a predictive pixel value. That is, video encoder 20 may determine a residual value representing a difference between the actual pixel value and the selected entry and encode the residue. Video encoder 20 may generate residual values for pixels in a block that are predicted by entries of a palette, and may generate a residue block including respective residual pixel values for the block of pixels. Video encoder 20 may subsequently apply transformation and quantization (as noted above with respect to FIG. 2) to the residue block. In this manner, video encoder 20 may generate quantized residual transform coefficients.

In another example, the residue may be coded losslessly (without transform and quantization) or without transform.

Video decoder 30 may inverse transform and inverse quantize the transform coefficients to reproduce the residual block. Video decoder 30 may then reconstruct a pixel value using the predictive palette entry value and the residual value for the pixel value. For example, video decoder 30 may combine the residual value with the palette entry value to reconstruct the coded pixel value.

In some examples, the delta value may be different for different CU sizes, picture sizes, color spaces or different color components. The delta value may be predetermined or determined based on various coding conditions. For example, video encoder 20 may signal the delta value to video decoder 30 using high level syntax, such as syntax in PPS, SPS, VPS and/or slice header. In other examples, video encoder 20 and video decoder 30 may be preconfigured to use the same, fixed delta value. In still other examples, video encoder 20 and/or video decoder 30 may adaptively derive the delta value based on side information (e.g., such as CU size, color space, color component, or the like, as noted above).

In some examples, a lossy coding palette mode may be included as an HEVC coding mode. For example, coding modes may include an intra-prediction mode, an inter-prediction mode, a lossless coding palette mode, and a lossy coding palette mode. In HEVC coding, as noted above with respect to FIGS. 2 and 3, a quantization parameter (QP) is used to control the allowed distortion. The value of delta for palette-based coding may be calculated or otherwise determined as a function of QP.

Generation of a palette using the lossy coding techniques described in this disclosure may be performed by video encoder 20, video decoder 30 or both. For example, video encoder 20 may generate entries in a palette for a CU using the delta comparison techniques described above and signal information for construction of the palette for use by video decoder 30. That is, video encoder 20 may be configured to signal information indicating pixel values for entries in a palette for a CU, and then encode pixel values using the pixel values associated with such palette entries. Video decoder 30 may construct a palette using such information, and may then use the entries to decode pixel values of a coded block. In some examples, video encoder 20 may signal index values that identify palette entries for one or more pixel positions of the coded block, and video decoder 30 may use the index values to retrieve the pertinent pixel value entries from the palette.

In other examples, video decoder 30 may be configured to construct a palette by applying the delta comparison techniques described above. For example, video decoder 30 may receive pixel values for positions within a coded block and may determine whether absolute differences between the pixel values and the existing pixel value entries in the palette are larger than a delta value. If so, video decoder 30 may add the pixel values as entries in the palette, e.g., for later use in palette-based decoding of pixel values for other pixel positions of the block using corresponding index values signaled by video encoder 20. In this case, video encoder 20 and video decoder 30 apply the same or similar processes to generate the palette. If not, video decoder 30 may not add the pixel values to the palette.

In an example for purposes of illustration, video decoder 30 may receive index values or pixel values for various pixel positions in a block. If an index value is received for a pixel position, for example, video decoder 30 may use the index value to identify an entry in the palette, and use the pixel value of the palette entry for the pixel position. If a pixel value is received for the pixel position, video decoder 30 may use the received pixel value for the pixel position, and may also apply the delta comparison to determine whether the pixel value should be added to the palette and then later used for palette coding.

On the encoder side, if a pixel value for a position in a block produces an absolute difference between the pixel value and an existing pixel value entry in the palette that is less than or equal to the delta value, video encoder 20 may send an index value to identify the entry in the palette for use in reconstructing the pixel value for that position. If a pixel value for a position in a block produces absolute difference values between the pixel value and the existing pixel value entries in the palette that are all greater than the delta value, video encoder 20 may send the pixel value and may add the pixel value as a new entry in the palette. To construct the palette, video decoder 30 may use delta values signaled by the encoder, rely on a fixed or known delta value, or infer or derive a delta value, e.g., as described above.

As noted above, video encoder 20 and/or video decoder 30 may use coding modes including an intra-prediction mode, an inter-prediction mode, a lossless coding palette mode, and a lossy coding palette mode when coding video data. According to some aspects of this disclosure, video encoder 20 and video decoder 30 may code one or more syntax elements indicating whether palette-based coding is enabled. For example, at each CU, video encoder 20 may encode a syntax element, such as a flag PLT_Mode_flag. The PLT_Mode_flag or other syntax element may indicate whether a palette-based coding mode is to be used for a given CU (or a PU in other examples). For example, this flag may be signaled in an encoded video bitstream at the CU level, and then received by video decoder 30 upon decoding the encoded video bitstream.

In this example, a value of this PLT_Mode_flag equal to 1 may specify that the current CU is encoded using a palette-based coding mode. In this case, video decoder 30 may apply the palette-based coding mode to decode the CU. In some examples, a syntax element may indicate one of a plurality of different palette-based coding modes for the CU (e.g., lossy or lossless). A value of this PLT_Mode_flag equal to 0 may specify that the current CU is encoded using a mode other than palette mode. For example, any of a variety of inter-predictive, intra-predictive, or other coding modes may be used. When a value of PLT_Mode_flag is 0, video encoder 20 may also encode additional data to indicate the specific mode used for encoding the respective CU (e.g., an HEVC coding mode). The use of the PLT_Mode_flag is described for purposes of example. In other examples, however, other syntax elements such as multi-bit codes may be used to indicate whether the palette-based coding mode is to be used for a CU (or PU in other examples) or to indicate which of a plurality of modes are to be used for coding.

In some examples, the above-described flag or other syntax elements may be transmitted at a higher level than the CU (or PU) level. For example, video encoder 20 may signal such a flag at a slice level. In this case, a value equal to 1 indicates that all of the CUs in the slice are encoded using palette mode. In this example, no additional mode information, e.g., for palette mode or other modes, is signaled at the CU level. In another example, video encoder 20 may signal such a flag in a PPS, SPS or VPS.

According to some aspects of this disclosure, video encoder 20 and/or video decoder 30 may code one or more syntax elements (e.g., such as the above-described flag) at one of the slice, PPS, SPS, or VPS levels specifying whether the palette mode is enabled or disabled for the particular slice, picture, sequence or the like, while the PLT_Mode_flag indicates whether the palette-based coding mode is used for each CU. In this case, if a flag or other syntax element sent at the slice, PPS, SPS or VPS level indicates that palette coding mode is disabled, in some examples, there may be no need to signal the PLT_Mode_flag for each CU. Alternatively, if a flag or other syntax element sent at the slice, PPS, SPS or VPS level indicates that palette coding mode is enabled, the PLT_Mode_flag may be further signaled to indicate whether the palette-based coding mode is to be used for each CU. Again, as mentioned above, application of these techniques for indicating palette-based coding of a CU could additionally or alternatively be used to indicate palette-based coding of a PU.

In some examples, the above-described syntax elements may be conditionally signaled in the bitstream. For example, video encoder 20 and video decoder 30 may only encode or decode, respectively, the syntax elements based on the size of the CU, the frame type, the color space, the color component, the frame size, the frame rate, the layer id in scalable video coding or the view id in multi-view coding.

While the examples described above relate to explicit signaling, e.g., with one or more syntax elements in a bitstream, in other examples, video encoder 20 and/or video decoder 30 may implicitly determine whether a palette coding mode is active and/or used for coding a particular block. Video encoder 20 and video decoder 30 may determine whether palette-based coding is used for a block based on, for example, the size of the CU, the frame type, the color space, the color component, the frame size, the frame rate, the layer id in scalable video coding or the view id in multi-view coding.

While the techniques of FIG. 2 are described above in the context of CUs (HEVC), it should be understood that the techniques may also be applied to prediction units (PUs) or in other video coding processes and/or standards.

Figure 3:
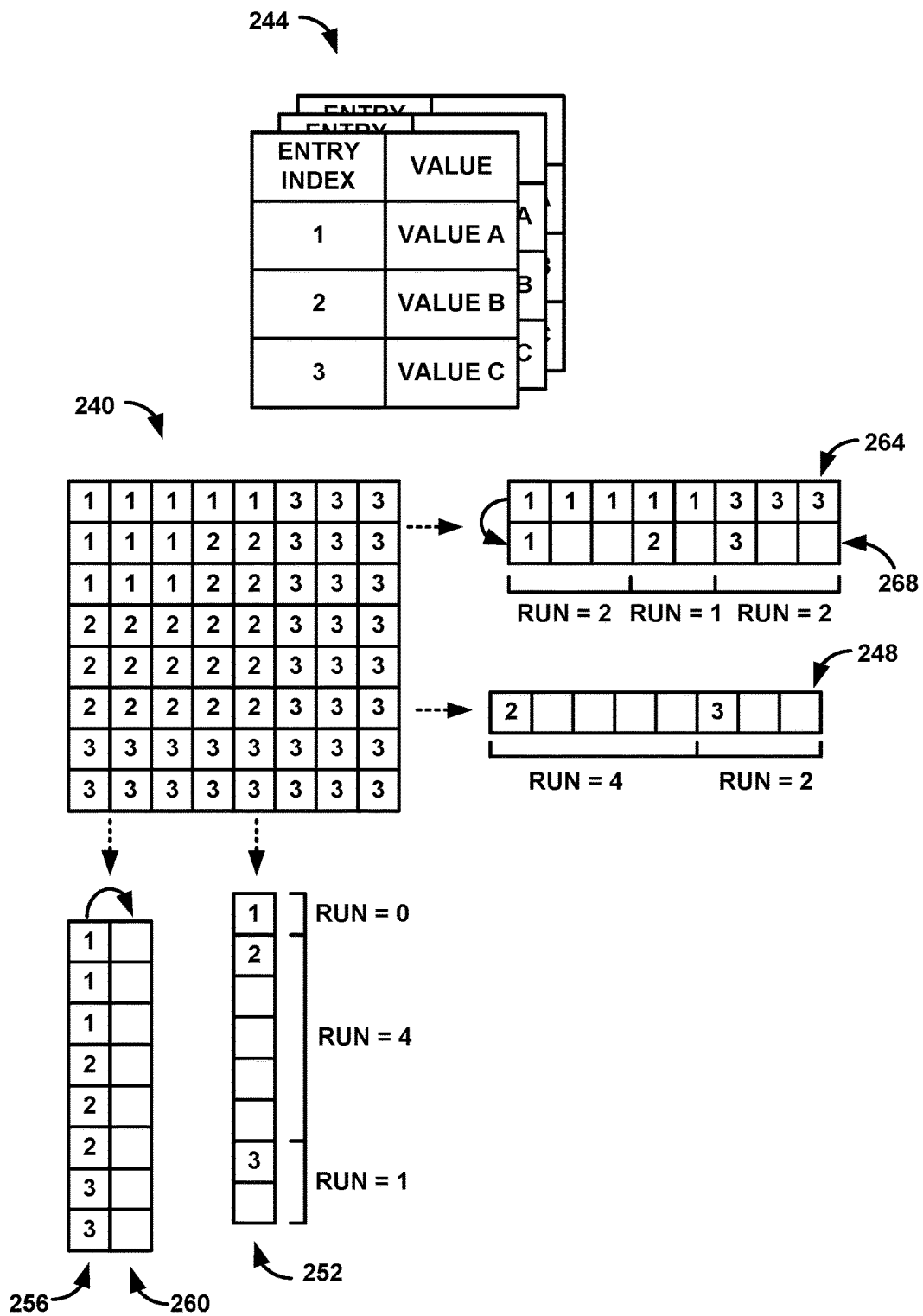
FIG. 3 is a conceptual diagram illustrating examples of determining indices to a palette for a video block, consistent with techniques of this disclosure.

FIG. 3 is a conceptual diagram illustrating examples of determining indices to a palette for a video block, consistent with techniques of this disclosure. For example, FIG. 3 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 2.

Again, the techniques of FIG. 3 are described in the context of video encoder 20 (FIG. 1 and FIG. 6) and video decoder 30 (FIG. 1 and FIG. 7) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 3 as including an index value for each pixel position, it should be understood that in other examples, not all pixel positions may be associated with an index value that indicates an entry of palettes 244 that specify the pixel value of the block. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 3 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

According to aspects of this disclosure, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

In some examples, all pixel locations in the current CU having pixel values that are in the palette for the current CU are encoded with a palette index followed by a "run" of the pixel value at consecutive pixel locations. In the case where there is only one entry in the palette, the transmission of the palette index or the "run" may be skipped for the current CU. In the case where the pixel value at one of the pixel locations in the current CU does not have an exact match to a pixel value in the palette, video encoder 20 may select one of the palette entries having the closest pixel value and may calculate a prediction error or residual value between the original pixel value and the prediction pixel value included in the palette. Video encoder 20 encodes and transmits the residual value for the pixel location to the video decoder. Video decoder 30 may then derive a pixel value at the pixel location based on the corresponding received palette index, and the derived pixel value and the residual value are then used to predict the original pixel value at the pixel location in the current CU. In one example, the residual value may be encoded using an HEVC method, such as applying a RQT to transform the residual value, quantize the transform coefficients, and entropy encode the quantized transform coefficients. In some cases, the above example may be referred to as lossy coding.

In an example for purposes of illustration, consider line 248 of map 240. Assuming a horizontal, left to right scan direction, line 248 includes five index values of "2" and three index values of "3." According to aspects of this disclosure, video encoder 20 may encode an index value of 2 for the first position of line 248 in the scan direction. In addition, video encoder 20 may encode one or more syntax elements indicating the run of consecutive values in the scan direction that have the same index value as the signaled index value. In the example of line 248, video encoder 20 may signal a run of 4, thereby indicating that the index values of the following four positions in the scan direction share the same index value as the signaled index value. Video encoder 20 may perform the same process for the next different index value in line 248. That is, video encoder 20 may encode an index value of 3 and one or more syntax elements indicating a run of two. Video decoder 30 may obtain the syntax elements indicating the index value and the number of consecutive indices in the scan direction having the same index value (the run).

As noted above, the indices of a map are scanned in a particular order. According to aspects of this disclosure, the scan direction may be vertical, horizontal, or at a diagonal (e.g., 45 degrees or 135 degrees diagonally in block). In some examples, video encoder 20 may encode one or more syntax elements for each block indicating a scan direction for scanning the indices of the block. Additionally or alternatively, the scan direction may be signaled or inferred based on so-called side information such as, for example, block size, color space, and/or color component. Video encoder 20 may specify scans for each color component of a block. Alternatively, a specified scan may apply to all color components of a block.

For example, with respect to a column based scan, consider column 252 of map 240. Assuming a vertical, top to bottom scan direction, column 252 includes one index value of "1," five index values of "2" and two index values of "3." According to aspects of this disclosure, video encoder 20 may encode an index value of 1 for the first position of line 252 in the scan direction (at the relative top of column 252). In addition, video encoder 20 may signal a run of zero, thereby indicating that the index value of the following position in the scan direction is different. Video encoder 20 may then encode an index value of 2 for the next position in the scan direction and one or more syntax elements indicating a run of four, i.e., that the index values of the following four positions in the scan direction share the same index value as the signaled index value. Video encoder 20 may then encode an index value of 3 for the next different index value in the scan direction and one or more syntax elements indicating a run of one. Video decoder 30 may obtain the syntax elements indicating the index value and the number of consecutive indices in the scan direction having the same index value (the run).

According to aspects of this disclosure, video encoder 20 and video decoder 30 may additionally or alternatively perform line copying for one or more entries of map 240. The line copying may depend, in some examples, on the scan direction. For example, video encoder 20 may indicate that a pixel or index value for a particular entry in a map is equal to a pixel or index value in a line above the particular entry (for a horizontal scan) or the column to the left of the particular entry (for a vertical scan). Video encoder 20 may also indicate, as a run, the number of pixel or index values in the scan order that are equal to the entry in the line above or the column to the left of the particular entry. In this example, video encoder 20 and or video decoder 30 may copy pixel or index values from the specified neighboring line and from the specified number of entries for the line of the map currently being coded.

In an example for purposes of illustration, consider columns 256 and 260 of map 240. Assuming a vertical, top to bottom scan direction, column 256 includes three index values of "1," three index values of "2," and two index values of "3." Column 260 includes the same index values having the same order in the scan direction. According to aspects of this disclosure, video encoder 20 may encode one or more syntax elements for column 260 indicating that the entire column 260 is copied from column 256. The one or more syntax elements may be associated with a first entry of column 260 at the relative top of map 240. Video decoder 30 may obtain the syntax elements indicating the line copying and copy the index values of column 256 for column 260 when decoding column 260.

According to aspects of this disclosure, the techniques for coding so-called runs of entries may be used in conjunction with the techniques for line copying described above. For example, video encoder 20 may encode one or more syntax elements (e.g., a flag) indicating whether the value of an entry in a map is obtained from a palette or the value of an entry in the map is obtained from a previously coded line in map 240. Video encoder 20 may also encode one or more syntax elements indicating an index value of a palette or the location of the entry in the line (the row or column). Video encoder 20 may also encode one or more syntax elements indicating a number of consecutive entries that share the same value. Video decoder 30 may obtain such information from an encoded bitstream and may use the information to reconstruct the map and pixel values for a block.

In an example for purposes of illustration, consider rows 264 and 268 of map 240. Assuming a horizontal, left to right scan direction, row 264 includes five index values of "1" and three index values of "3." Row 268 includes three index values of "1," two index values of "2," and three index values of "3." In this example, video encoder 20 may identify particular entries of row 264 followed by a run when encoding data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 is the same as the first position of row 264.

In some examples, video encoder 20 may also determine whether to code the current pixel or index value relative to a position in another row (or column) or to code the current pixel or index value using a run syntax element. For example, after encoding the one or more syntax elements indicating the first position of row 264 and the run of two entries (noted above), video encoder 20 may encode, for the fourth and fifth positions in line 268 (from left to right), one or more syntax elements indicating a value of 2 for the fourth position and one or more syntax elements indicating a run of 1. Hence, video encoder 20 encodes these two positions without reference to another line (or column). Video encoder 20 may then code the first position having an index value of 3 in row 268 relative to upper row 264 (e.g., indicating a copy from upper row 264 and the run of consecutive positions in the scan order having the same index value). Hence, according to aspects of this disclosure, video encoder 20 may select between coding pixel or index values of a line (or column) relative to other values of the line (or column), e.g., using a run, coding pixel or index values of a line (or column) relative to values of another line (or column), or a combination thereof. In some examples, video encoder 20 may perform a rate/distortion optimization to make the selection.

Video decoder 30 may receive the syntax elements described above and may reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value.

In some instances, the line from which entries are copied may be directly adjacent to the entry of the line currently being coded (as illustrated in the examples of FIG. 3). However, in other examples, a number of lines may be buffered by video encoder 20 and/or video decoder 30, such that any of the number of lines of the map may be used as predictive entries for a line of the map currently being coded. Hence, in some examples, the pixel value for an entry may be signaled to be equal to a pixel value of an entry in a row immediately above (or column to the left of) or two or more rows above (or column to the left of) the current row.

In an example for purposes of illustration, video encoder 20 and/or video decoder 30 may be configured to store the previous n rows of entries prior to coding a current row of entries. In this example, video encoder 20 may indicate the predictive row (the row from which entries are copied) in a bitstream with a truncated unary code or other codes. In another example, video encoder 20 may encode (and video decoder 30 may decode) a displacement value between the current line and the predictive line of map 240 used as a reference for coding the current line. That is, video encoder 20 may encode an indication of a particular line (or column) from which an index value is copied. In some examples, the displacement value may be a displacement vector. That is, let $c[0], c[1], \ldots,$ denote the indices of the current line of map 240 and let $u[0], u[1], u[2], \ldots,$ denote the indices of a predictive line of map 240, such as an upper neighboring line. In this example, given a displacement vector is d, the index value for $c[i]$ may be predicted from $u[i+d]$, or $u[i-d]$ to avoid d taking negative values. The value of d may be coded using unary, truncated unary, exponential Golomb or Golomb-Rice codes.

As another example, video encoder 20 may signal an instruction, such as "copy from up line left half" or "copy from up line right half," indicating the neighboring line and the number or portion of entries of the neighboring line to copy to the line of the map currently being coded. As an additional example, the map of index values may be re-ordered before coding. For example, the map of index values may be rotated by 90, 180 or 270 degrees, or flipped upside down or left-side right to improve coding efficiency.

In other examples, video encoder 20 may not transmit runs of like-valued index values of map 240 to video decoder 30. In this case, video encoder 20 and/or video decoder 30 may implicitly derive the values of the runs. In one example, the value of a run may be a constant value, e.g., 4, 8, 16, or the like. In another example, the value of a run may be dependent on side information for the current block of video data being coded such as, for example, the block size, the quantization parameter (QP), the frame type, the color component, the color format (e.g., 4:4:4, 4:2:2, or 4:2:0), the color space (e.g., YUV or RGB), the scan direction and/or other types of characteristic information for the current block. In the case where the value of a run depends on the block size, the run may be equal to the width of the current block, the height of the current block, the half-width (or half-height) of the current block, a fraction of the width and/or the height of the current block, or a multiple of the width and/or the height of the current block. In another example, video encoder 20 may signal the value of a run to video decoder 30 using high level syntax, such as syntax in a picture parameter set (PPS), a sequence parameter set (SPS), a video parameter set (VPS) and/or a slice header.

Additionally or alternatively, video encoder 20 may not even need to transmit map 240 to video decoder 30. Instead, video encoder 20 and/or video decoder 30 may implicitly derive a start position or location of each run of index values included in map 240. In one example, the video coding standard applied by video encoder 20 and/or video decoder 30 may determine that a run can only start at certain locations. For example, the run may only start at the beginning of each row, or the beginning of every N rows of a current block being coded. The start location may be different for different scan directions. For example, if the vertical scan is used, the run may only start at the beginning of a column or the beginning of every N columns of the current block.

In another example, the start location may be derived depending on side information for the current block such as, for example, the block size, the QP, the frame type, the color component, the color format (e.g., 4:4:4, 4:2:2, or 4:2:0), the color space (e.g., YUV or RGB), the scan direction and/or other types of characteristic information for the current block. In the case where the start location of a run depends on the block size, the start location may be the mid-point of each row and/or each column, or a fraction (e.g., 1/n, 2/n, ... (n–1)/n) of each row and/or column. In another example, video encoder 20 may signal the start position to video decoder 30 using high level syntax, such as syntax in a PPS, a SPS, a VPS and/or a slice header.

In some examples, the implicit start position derivation and the implicit run derivation, each described above, may be combined. For example, video encoder 20 and/or video decoder 30 may determine that a run of like-valued index values of the map is equal to a distance between two neighboring start positions. In the case where the start position is the beginning (i.e., the first position) of every row of a current block, then video encoder 20 and/or video decoder 30 may determine that the length of the run is equal to the length of an entire row of the current block.

Figure 4:
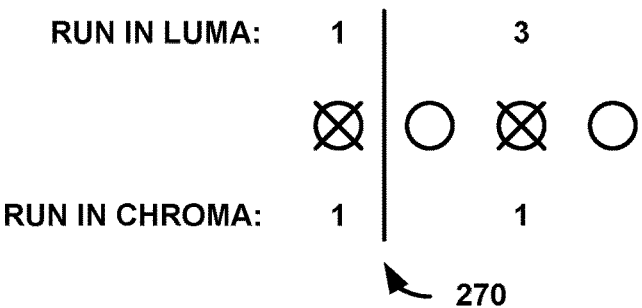
FIG. 4 is a conceptual diagram illustrating examples of determining a geometric edge of a video block using a run of palette indices for the luma component adaptively down-sampled for the chroma components, consistent with techniques of this disclosure.
Figure 4:
Figure 4:
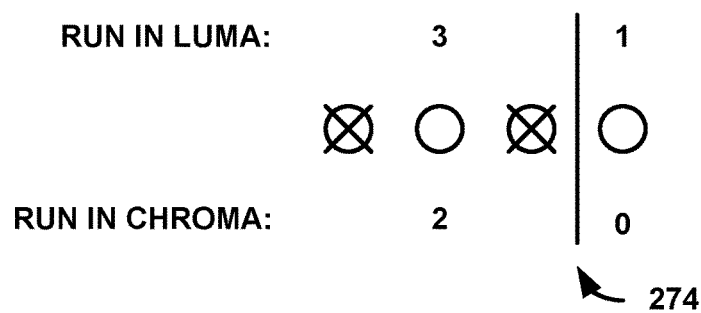

FIG. 4 is a conceptual diagram illustrating examples of determining a geometric edge 270, 272 or 274 of a video block using a run of palette indices for the luma component adaptively downsampled for the chroma components, consistent with techniques of this disclosure. In FIG. 4, the luma samples are illustrated as un-filled circles, and the chroma samples are illustrated as one of the luma samples overlaid with an x-symbol. FIG. 4 illustrates examples of different run values for luma and chroma components based on a location of geometric edge 270, 272 or 274 of the video block.

In some cases, one palette is generated and shared for multiple color components in the current block, and in other cases, separate palettes are generated for one or more of the color components. In one case, one palette may be generated for the luma component and another palette may be generated for both the chroma components. In either case, the geometric information may be shared between the color components. Usually there is high correlation between edge locations of collocated blocks in different color components because the chroma components may have been downsampled from the luma components in a pre-defined way, such as 4:2:2 or 4:2:0 sampling.

For example, in palette-based coding, run coding may be used to indicate geometry information for the current block because an edge of the current block will break the run. In case of the 4:4:4 chroma format, the run may be generated once and used for all color components. The run may be generated based on one of the color components, or the run may be generated using more than one of the color components. In case of the 4:2:2 chroma format, the run used for the luma component may be horizontally downsampled by a factor of two for application to the chroma components. In the case of the 4:2:0 chroma format, the run used for the luma component may be horizontally and vertically downsampled by a factor of two for application to the chroma components.

In some cases, the run downsampling method can be adaptive to a chroma downsampling method. In this case, the downsampled run value for the chroma components may be differently calculated according to the location of the edge, e.g., edge 270, 272 or 274, of the video block as shown in FIG. 4. In a first example, FIG. 4 illustrates a geometric edge 270 between two neighboring video blocks that is positioned such that a run for the luma component has a value "1" in the left-hand block and a value of "3" in the right-hand block. In this case, the downsampled run for the chroma components has a value of "1" in both the left-hand block and the right-hand block. In a second example, FIG. 4 illustrates a geometric edge 272 between two neighboring video blocks that is positioned such that a run for the luma component has a value "2" in both the left-hand block and the right-hand block. In this case, the downsampled run for the chroma components has a value of "1" in both the left-hand block and the right-hand block. In a third example, FIG. 4 illustrates a geometric edge 274 between two neighboring video blocks that is positioned such that a run for the luma component has a value "3" in the left-hand block and a value of "1" in the right-hand block. In this case, the downsampled run for the chroma components has a value of "2" in the left-hand block and a value of "0" in the right-hand block.

In addition to the geometric information, it may also be possible to have a single palette for pixel value of all color components. For example, for each pixel location in the current block, the pixel values in three color components (e.g., Y luma and both U and V chroma components) may form a vector (i.e., a color vector). Then, a palette may be formed by selecting a certain number of vectors to represent the current block. It may be possible to have one palette of pixel values for the luma component, and another palette of pixel values for the chroma components. In some cases, it may also be possible to combine the two methods of sharing geometry information and having a single palette of pixel values using a color vector.

In some examples, the line copying described in more detail elsewhere in this disclosure may also work with a single palette. In this case, the palette index for each pixel location is signaled as being equal to the palette index of the row above, if the scan is horizontal, or the column on the left, if the scan is vertical, and then the associated run of palette indices is also copied from the previous row or column. With a shared palette, a palette entry may be a triplet of (Y, U, V), so that later Y, U, V values may be reconstructed from the palette index. The reconstructed values may serve as the decoded pixel values or may serve as prediction values that are combined with residual values to derive the decoded pixel values. In the 4:2:2 chroma format and the 4:2:0 chroma format, the chroma components have been downsampled compared to the luma components. In the example of a 2:1 downsampling, the luma positions may be at 0, 1, 2, . . . , and the chroma positions may be at 1, 3, 5, . . . or may be at 0, 2, 4, . . . . For positions where chroma components do not exist, the U and V components in the palette entry may be discarded.

Figure 5:
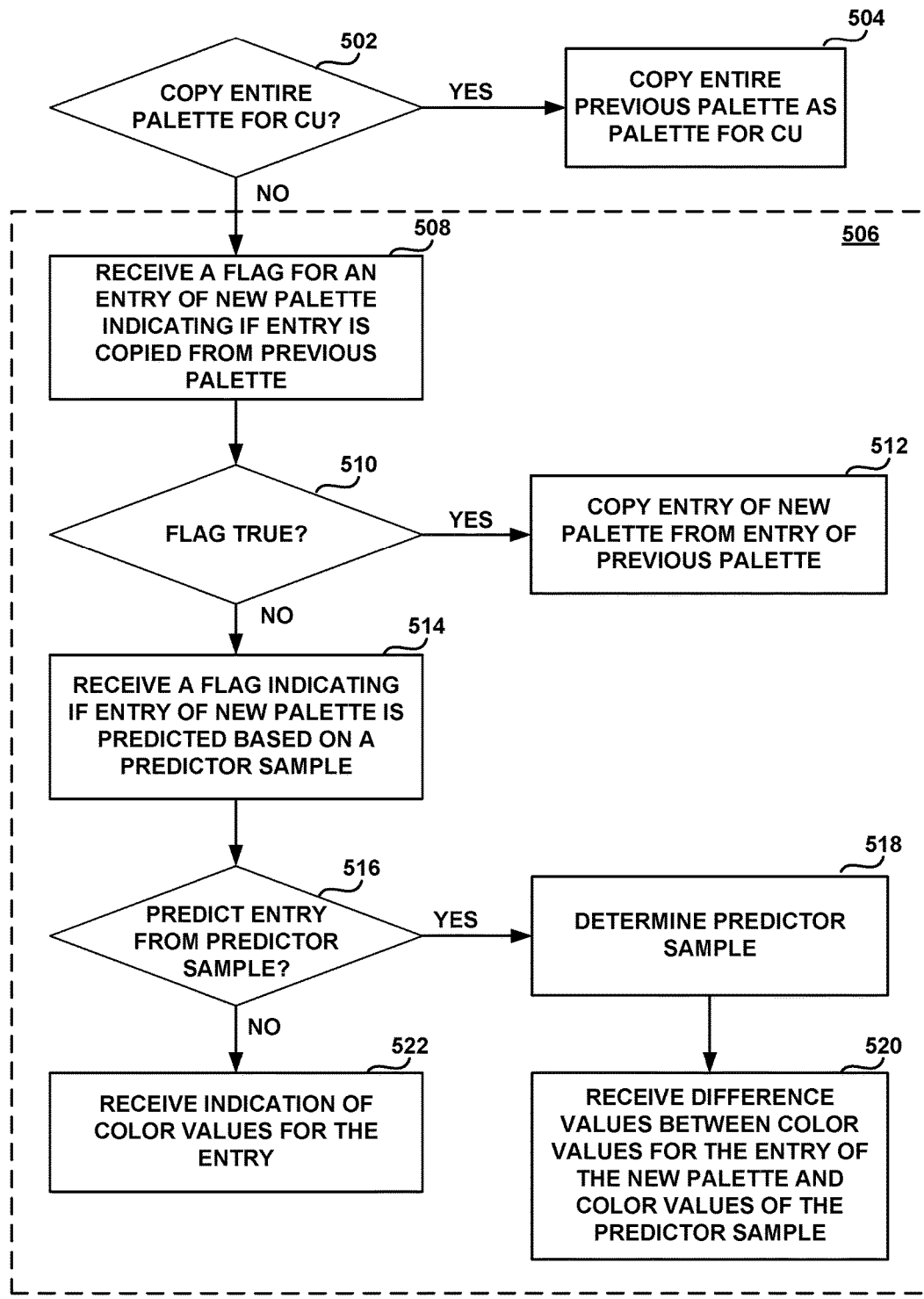
FIG. 5 is a flowchart illustrating techniques of this disclosure.

FIG. 5 is a flow diagram illustrating how video decoder 30 may determine a palette in accordance with the techniques of this disclosure. Video decoder 30 may receive or infer a value for a CU-level syntax element. Based on the syntax element, video decoder may determine whether or not to copy an entire previously determined palette as the palette to be used for a current CU (502). If the value of the syntax element indicates the entire palette is to be copied (502, YES), then video decoder 30 copies the entire previous palette and uses that same palette for the current CU (504). If the value of the syntax element indicates the entire palette is not to be copied (502, NO), then video decoder 30 generates a new palette. The steps of box 506 show an example of how such a new palette may be generated. The steps of box 506 may, for example, be performed for each palette entry in the new palette.

For a first palette entry, video decoder 30 receives a flag indicating if the first entry is to be copied from an entry of a previous palette (508). If the value of the flag is true (510, YES), indicating that the first entry is to be copied from an entry of the previous palette, then video decoder 30 copies the first entry for the new palette from an entry of the previous palette (512). If the value of the flag is false (510, NO), indicating that the first entry is not to be copied from an entry of the previous palette, then video decoder 30 determines a new entry for the new palette. As part of determining the new entry, video decoder 30 receives a flag indicating if the new entry for the new palette is predicted based on a predictor sample (514). If the value of the flag indicates the new entry is to be predicted from a predictor sample (516, YES), then video decoder 30 determines the predictor sample (518) and receives difference values indicating the difference between the color values of the first palette entry and the color values of the predictor sample (520). If the value of the flag indicates the new entry is not to be predicted from a predictor sample (516, NO), then video decoder 30 receives values indicating the color values of the first palette entry (522). To generate a new palette, video decoder may perform the steps of box 506 multiple times for the various entries included in the palette.

The techniques of FIG. 5 are merely one example of how the techniques of this disclosure may be implemented into a larger scheme for determining the palettes used in palette mode coding. In some examples, the flag of decision box 514 may be excluded, in which case the "no" path of box 510 may lead directly into box 518, and boxes 514, 516, and 522 may be excluded altogether.

This disclosure describes techniques related to coding palette entries and, more particularly, to the coding of new palette entries that are not predicted. In this context, "not predicted" means the palette entry is not copied from an already-used palette. According to existing techniques, a palette for a coding unit is either predicted (i.e. copied in full) from another coding unit, or a new palette is generated for the coding unit. As explained above, even when a new palette is generated, some entries of the new palette may still be predicted (i.e. copied) from a palette of a previous coding unit. Other entries in the new palette, however, may be new entries that are not predicted from a previous palette. This disclosure describes techniques for generating new palettes and, more specifically, for determining new entries for new palettes. In various existing implementations of palette coding, the new palette entries are coded using fixed length code with length depending on the bit-depth of the samples within the current sequence. As part of generating the new palettes, the techniques of this disclosure may include determining predictor values for new palette entries of the palette. This use of predictor values, however, is separate and distinct from the type of prediction controlled by the pred_palette_flag syntax element, which involves the direct copying of entire palettes.

It is observed that the new palette entries do exhibit some correlation with respect to spatial neighbouring samples and it would be efficient to code them such that any redundancies are removed. However, in the current (as of the filing date of the present application) SCC WD, the new palette entries are coded using fixed length code without considering neighboring samples which may be inefficient.

In this document, several aspects for coding (encoding and decoding) of new palette entries that are not predicted are described. These aspects can work either independently or jointly with various combinations.

In the examples below, a sample consists of three components (YUV/RGB) and all operation are performed on each component independently. Similarly a PLT entry consists of three components.

For coding the new PLT entries that are not predicted (i.e., the syntax element pred_palette_flag indicates the palettes are not copied), a bypass coded flag is signalled to indicate if the new PLT entry is predicted from the predictor or not. If it is not predicted, then new PLT entry is coded using a fixed length bypass code, with length based on the bit-depth of the samples in the sequence.

When the new PLT entry is predicted from the predictor then an example coding system may include one or more of the following techniques, in suitable combination.

According to one technique, a predictor sample may be chosen from reconstructed neighboring samples of the current coding unit. The predictor sample may include three components (YUV/RGB), and each component of the new entries may be subtracted from the corresponding predictor sample to determine the residue.

According to another technique, a predictor sample may be implicitly derived by determining one or a combination of a sample corresponding to a center position of an above line, a sample corresponding to one of the sample position of the above line, a sample corresponding to an average of above line samples, a sample corresponding to a center position of a left line, a sample corresponding to one of the sample positions of the left line, a sample corresponding to an average of left line samples, a sample corresponding to an average of above and left line samples. In another example, multiple candidates from the neighboring samples may be identified as predictors, and a predictor candidate from among the identified multiple candidates may be signaled. When a neighboring sample is not available, a default predictor may be considered to be 0 or another default value such as 128. Additionally or alternatively, if a predictor is not available (outside of the frame, slice, tile), the prediction may be disabled, and the flag may not need to be signalled or shall be signaled as 0, alternatively to use some default prediction, e.g. 128. A predictor may be used from the intra reference, e.g. after padding for CIP.

The residue may be coded using truncated exponential Golomb codes with order 4. The sign of the residue may be coded using a 1-bit fixed length bypass code. The sign is not coded if the residue is zero. Alternatively, the residue may be coded using Truncated exponential Golomb codes with other orders such as (0, 1, 2, 3, 4, 5 . . . ). Alternatively the residues may be coded using truncated Golomb codes with orders such as (0, 1, 2, 3, 4, 5, 6 . . . )

Alternatively it is proposed that Golomb code family, e.g. Golomb Rice code, exponential Golomb code, Unary code, or concatenation of Golomb Rice and exponential Golomb code be used to represent the residues.

The table below shows syntax that may be used to implement one or more of the techniques described in this disclosure. In the example below, underlined text represents additional syntax that may be used to implement the techniques of this disclosure.

| palette_coding( x0, y0, nCbS ) { | Descriptor |
|---|---|
| palette_share_flag[ x0 ][ y0 ] | ae(v) |
| ................... | |
| ................... | |
| if( paletteNumPredictedEntries < palette_max_size ) | |
|   palette_num_signalled_entries | ae(v) |
|   <u>for( i = 0; i < palette_num_signalled_entries; i++ ) {</u> | |
|     <u>palette_predicted_entry</u> | <u>ae(v)</u> |

| palette_coding( x0, y0, nCbS ) { | Descriptor |
|---|---|
|   <u>for( cIdx = 0; cIdx < 3; cIdx++ ){</u> | |
|     <u>if(palette_predicted_entry){</u> | |
|       <u>delta_palette_entry</u> | <u>ae(v)</u> |
|       <u>delta_palette_entry_sign_flag</u> | <u>ae(v)</u> |
|     <u>}else</u> | |
|       <u>palette_entry</u> | <u>ae(v)</u> |
|     } | |
|   } | |
| ................................ | |
| } | | palette_predicted_entry specifies that whether the palette_entry is predicted or not. When not present it is inferred to be zero.

delta_palette_entry specifies the residue of a component in a palette entry for the current palette.

delta_palette_entry_sign_flag specifies the sign of the residue of a component in a palette entry for the current palette palette_entry specifies the value of a component in a palette entry for the current palette.

The variable PredictorPaletteEntries [cIdx][i] specifies the i-th element in the predictor palette for the colour component cIdx.

The variable CurrentPaletteEntries [cIdx][i] specifies the i-th element in the current palette for the colour component cIdx and is derived as follows:

When palette_share_flag [x0][y0] is equal to 1, CurrentPaletteEntries is derived as follows:

```
If palette_share_flag [ x0 ][ y0 ] is equal to 1,
  for( cIdx = 0; cIdx < 3; cIdx++ )
    for( i = 0; i < PreviousPaletteSize; i++ )                                    (7-73)
      CurrentPaletteEntries[ cIdx ][ i ] = PredictorPaletteEntries[ cIdx ][ i ]
Otherwise (palette_share_flag [ x0 ][ y0 ] is equal to 0)
  numPredictedPaletteEntries = 0
  for( i = 0; i < PredictorPaletteSize; i++ )
    if( PalettePredictorEntryReuseFlag[ i ] = = 1 ) {
      for( cIdx = 0; cIdx < 3; cIdx++ )
        CurrentPaletteEntries[ cIdx ][ numPredictedPaletteEntries ] =
PredictorPaletteEntries[ cIdx ][ i ]
      numPredictedPaletteEntries++
    }
  for( i = 0; i < num_signalled_palette_entries; i++ )                            (7-74)
    for( cIdx = 0; cIdx < 3; cIdx++ )
      if(palette_predicted_entry)
        CurrentPaletteEntries[ cIdx ][ numPredictedPaletteEntries + i ] =
delta_palette_entry *(1 − 2 * delta_palette_entry_sign_flag + pred[ cIdx ]
      else
        CurrentPaletteEntries[ cIdxv ][ numPredictedPaletteEntries + i ] = palette_entry
```

| palette_coding( ) | palette_share_flag | FL | cMax = 1 |
|---|---|---|---|
| | ........ | .. | — |
| | palette_num_signalled_entries | TR | cMax = 31, cRiceParam = 0 |
| | palette_predicted_entry | FL | cMax = 1 |
| | delta_palette_entry | EG | 4 |
| | delta_palette_entry_sign_flag | FL | cMax = 1 |
| | palette_entry | FL | cMax = cIdx = = 0 ? ( (1<<BitDepth$_Y$) − 1 ) : ( (1<<BitDepth$_C$) − 1 ) |

FIG. 6 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a video data memory 33, partitioning unit 35, prediction processing unit 41, summer 50, transform processing unit 52, quantization unit 54, entropy encoding unit 56. Prediction processing unit 41 includes palette-based encoding unit 42, inter-prediction processing unit 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 6, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Inter-prediction processing unit 44 within prediction processing unit 41 perform inter-predictive coding of the current video block relative to one or more predictive blocks in one or more reference pictures to provide temporal compression.

Inter-prediction processing unit 44 may be configured to determine the inter-prediction mode for a video slice according to a predetermined pattern for a video sequence. The predetermined pattern may designate video slices in the sequence as P slices or B slices. Motion estimation, performed by inter-prediction processing unit 44, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, inter-prediction processing unit 44 may perform a motion search relative to the full pixel positions and fractional pixel positions and output a motion vector with fractional pixel precision.

Inter-prediction processing unit 44 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Inter-prediction processing unit 44 sends the calculated motion vector to entropy encoding unit 56.

Motion compensation, performed by inter-prediction processing unit 44, may involve fetching or generating the predictive block based on the motion vector determined by motion estimation, possibly performing interpolations to sub-pixel precision. Upon determining the motion vector for the PU of the current video block, inter-prediction processing unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Inter-prediction processing unit 44 may also generate syntax elements associated with the video blocks and the video slice for use by video decoder 30 in decoding the video blocks of the video slice.

Prediction processing unit 41 also includes a palette-based encoding unit 42 configured to perform various aspects of the palette-based coding techniques described in this disclosure. Palette-based encoding unit 42, for example, may perform palette-based decoding when a palette-based encoding mode is selected, e.g., for a CU or PU. For example, palette-based encoding unit 42 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 42, some or all of such functions may be performed by other processing units, or a combination of different processing units.

Palette-based encoding unit 42 may be configured to generate any of the various syntax elements described herein, including generating one or more syntax elements indicative of the difference between one or more color values of an entry for a palette and one or more color values of a predictor sample. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such as HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

After prediction processing unit 41 generates the predictive block for the current video block, either via intra prediction, inter prediction, or palette mode coding, video encoder 20 forms a residual video block by subtracting the predictive block from the current video block. For some coding modes, however, video encoder 20 may not encode a residual block. When generated, the residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Inter-prediction processing unit 44 may calculate a reference block by adding the residual block to a predictive block of one of the reference pictures within one of the reference picture lists. Inter-prediction processing unit 44 may also apply one or more interpolation filters to the reconstructed residual block to calculate sub-integer pixel values for use in motion estimation. Summer 62 adds the reconstructed residual block to the motion compensated prediction block produced by inter-prediction processing unit 44 to produce a reconstructed block.

Filter unit 64 filters the reconstructed block (e.g. the output of summer 62) and stores the filtered reconstructed block in DPB 66 for uses as a reference block. The reference block may be used by inter-prediction processing unit 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

In accordance with the techniques of this disclosure, prediction processing unit 41 may determine that a coding unit is coded in a palette mode. Prediction processing unit 41 may, for example, make such a determination by encoding the CU in a variety of different coding modes and with a variety of different encoding parameters and determine that the palette mode provides a desirable rate-distortion tradeoff for the coding unit. As part of encoding the coding unit in a palette mode, palette-based encoding unit 42 may determine a palette for the coding unit. To determine the palette, palette-based encoding unit 42 may, for a first entry of the palette, choose a predictor sample from a reconstructed neighboring block of the coding unit and code a difference between one or more color values of the first entry and one or more color values of the predictor sample. Palette-based encoding unit 42 may, for example, choose the predictor sample for the current coding unit using any of the techniques described above.

As part of coding the difference between the one or more color values of the first entry and the one or more color values of the predictor sample, palette-based encoding unit 42 may determine the first entry of the palette for the current coding unit and compare the first entry of the palette to the predictor sample to determine the difference between the first entry of the palette and the predictor sample. Palette-based encoding unit 42 may, for example, compare each color value of the first entry to a corresponding color value of the predictor sample, with the first palette entry and the predictor sample each including color values for three components (e.g. YUV components or RGB components). Palette-based encoding unit, in conjunction with entropy encoding unit 56, may encode residue data by generating one or more syntax elements indicative of the difference between the one or more color values of the first entry and the one or more color values of the predictor sample. Entropy encoding unit 56 may entropy encode the difference between one or more color values of the first entry and one or more color values of the predictor sample using a Golomb coding process, such as truncated exponential Golomb codes or truncated Golomb codes.

Figure 7:
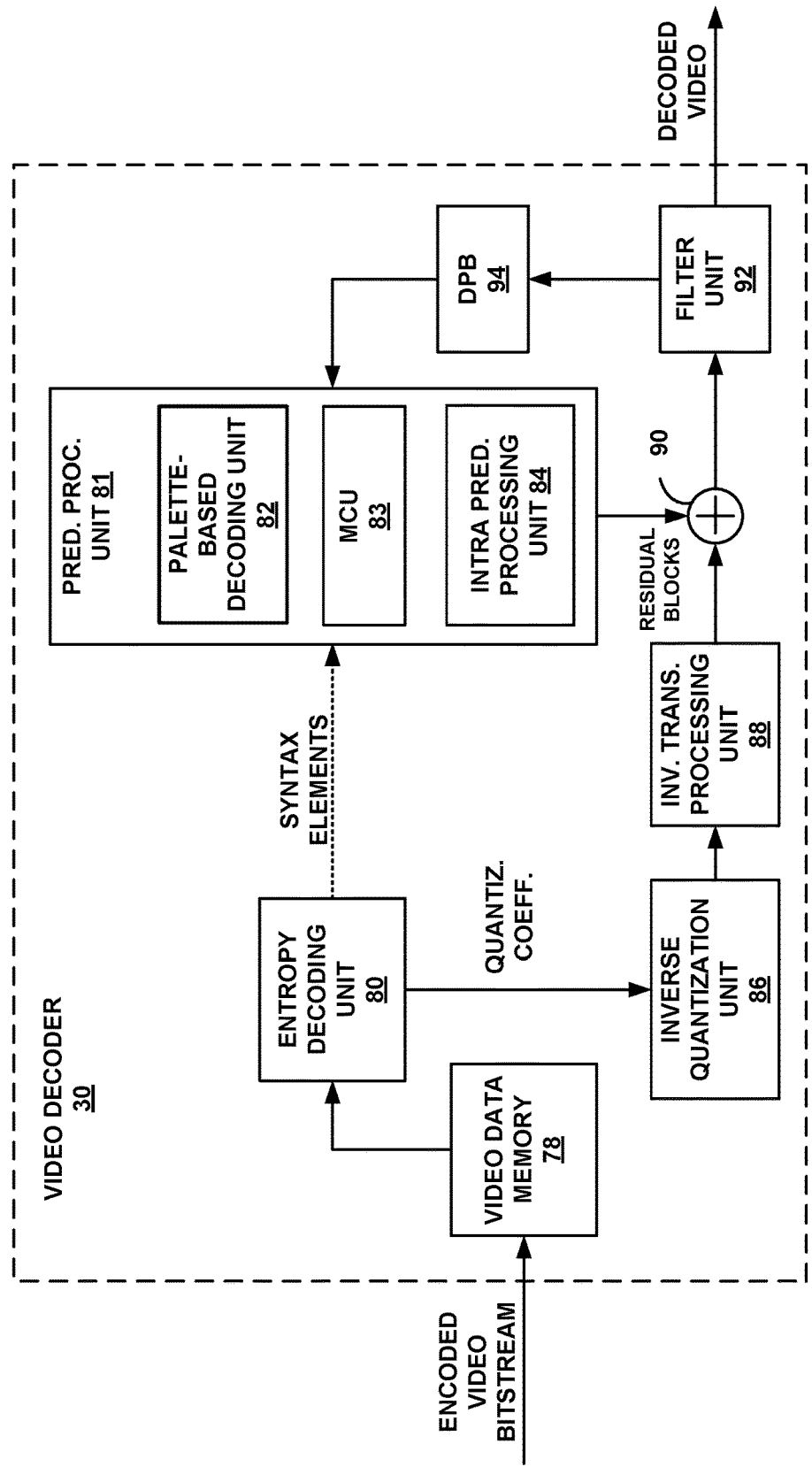
FIG. 7 is a block diagram illustrating an example video decoder that may implement the techniques described in this disclosure.

FIG. 7 is a block diagram illustrating an example video decoder 30 that may implement the techniques described in this disclosure. In the example of FIG. 7, video decoder 30 includes video data memory 78, entropy decoding unit 80, prediction processing unit 81, inverse quantization unit 86, inverse transform processing unit 88, summer 90, and DPB 94. Prediction processing unit 81 includes palette-based decoding unit 82, motion compensation unit (MCU) 83, and intra prediction unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 83 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 83 determines prediction information for a video block of the current video slice by parsing the motion vectors and other syntax elements, and uses the prediction information to produce the predictive blocks for the current video block being decoded. For example, motion compensation unit 83 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 83 may also perform interpolation based on interpolation filters. Motion compensation unit 83 may use interpolation filters as used by video encoder 20 during encoding of the video blocks to calculate interpolated values for sub-integer pixels of reference blocks. In this case, motion compensation unit 83 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

In accordance with various examples of this disclosure, video decoder 30 may be configured to perform palette-based coding. Palette-based decoding unit 82, for example, may perform palette-based decoding when a palette-based decoding mode is selected, e.g., for a CU or PU. For example, palette-based decoding unit 82 may be configured to generate a palette having entries indicating pixel values by decoding residue data to determine the difference between color values of a palette entry and color values of a predictor sample. Based on the decoded residue data and the predictor sample, palette-based decoding unit 82 can determine the palette entry. As explained above, some other entries of the palette may be determined using the same technique, while other entries of the palette are determined using a different technique.

Furthermore, in this example, palette-based decoding unit 82 may receive information associating at least some positions of a block of video data with entries in the palette. In this example, palette-based decoding unit 82 may select pixel values in the palette based on the information. Additionally, in this example, palette-based decoding unit 82 may reconstruct pixel values of the block based on the selected pixel values. Although various functions are described as being performed by palette-based decoding unit 82, some or all of such functions may be performed by other processing units, or a combination of different processing units.

Palette-based decoding unit 82 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 82 decodes the block of video data using a non-palette based coding mode, e.g., such an HEVC inter-predictive or intra-predictive coding mode. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 83. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

In accordance with the techniques of this disclosure, prediction processing unit 81 may determine a current coding unit is coded in a palette mode. Palette-based decoding unit 82 may determine a palette for the coding unit. To determine the palette, palette-based decoding unit 82 may, for a first entry of the palette, choose a predictor sample from a reconstructed neighboring block of the coding unit and code (i.e., decode) a difference between one or more color values of the first entry and one or more color values of the predictor sample. Palette-based decoding unit 82 may, for example, choose the predictor sample for the current coding unit using any of the techniques described above.

To code the difference between the first palette entry and predictor sample, palette-based decoding unit 82 may decode residue data to determine the difference between color values of the first palette entry and the predictor sample. Based on the decoded residue data and the predictor sample, palette-based decoding unit 82 may determining the first palette entry for the current coding unit. Palette-based decoding unit 82 may, for example, add the residue data to the color values of the predictor sample to determine the palette entry. To decode the difference between one or more color values of the first entry and one or more color values of the predictor sample, entropy decoding unit 80 may decode one or more difference values using a Golomb coding process, such as truncated exponential Golomb codes or truncated Golomb codes.

Palette-based decoding unit 82 may receive a flag for the first entry of the palette, where a first value of the flag indicates the first entry for the palette is predicted from the predictor sample. Palette-based decoding unit 82 may receive a second instance of the flag for a second entry of the palette, where a second value of the flag indicates the second entry for the palette is not predicted from any predictor sample. In response to receiving the flag with the second value for the second entry of the palette, palette-based decoding unit 82 may receive indications of the color values for the second entry. The indications of the color values for the second entry may, for example, be fixed-length coded codewords. In this example, the first and second entry are merely intended to represent different entries of the palette, and the terms first and second do not represent any sort of ordinal relationship between the two entries.

After palette-based decoding unit 82 has generated the palette to be used for the current coding unit, palette-based decoding unit 82 receives, for a sample of the current coding unit, an index value that identifies an entry from the palette. Palette-based decoding unit 82 assigns one or more color values associated with the entry to the sample. As part of determining a reconstructed coding unit, palette-based decoding unit 82 may receive index values for additional samples in the coding unit. Video decoder 30 may output, e.g., display or transmit to a display, a frame of video data that includes the reconstructed coding unit.

Figure 8:
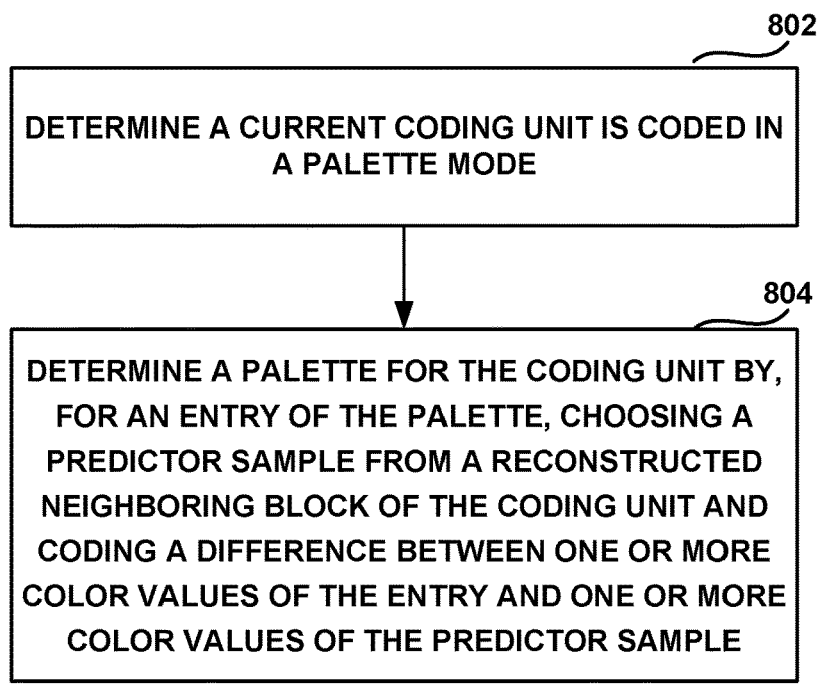
FIG. 8 is a flowchart illustrating techniques of this disclosure.

FIG. 8 is a flowchart illustrating techniques of this disclosure. The techniques of FIG. 8 will be described with respect to a generic video coder. The generic video coder may, for example, correspond to video encoder 20 of FIGS. 1 and 6 or video decoder 30 of FIGS. 1 and 7, although the techniques of this disclosure are not limited to any particular type of video coder. In the example of FIG. 8, the video coder (e.g., video encoder 20 or video decoder 30) determines a current coding unit is coded in a palette mode (802). The video coder then determines a palette for the coding unit. For example, the video coder may, for an entry of the palette, choose a predictor sample from a reconstructed neighboring block of the coding unit and codes a difference between one or more color values of the entry and one or more color values of the predictor sample (804).

The predictor sample may, for example, include three components, such as YUV components or RGB components. In other examples, the predictor samples may include a different number of components or different components. In the example of FIG. 8, the video coder may code a difference between the values of the three components of the palette entry and the values of the three components of the predictor sample. In such an example, to code the difference, the video coder may code three separate difference values, i.e., one for each component.

Figure 9:
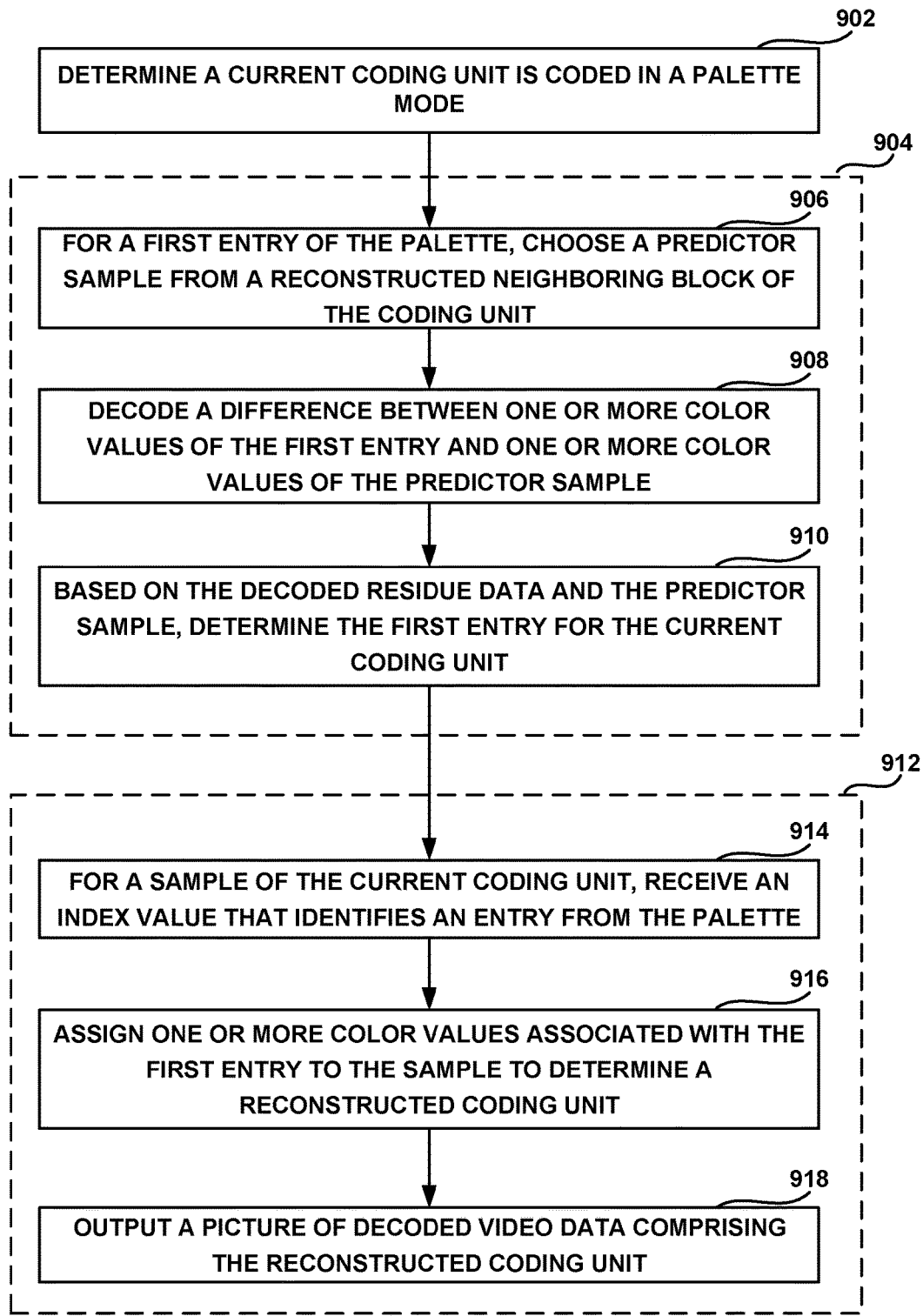
FIG. 9 is a flowchart illustrating techniques of this disclosure.

FIG. 9 is a flowchart illustrating techniques of this disclosure. The techniques of FIG. 9 will be described with respect to a generic video decoder. The generic video decoder may, for example, correspond to video decoder 30 of FIGS. 1 and 7, although the techniques of this disclosure are not limited to any particular type of video decoder. In the example of FIG. 9, the video decoder (e.g., video decoder 30) may determine a current CU of video data is coded in a palette mode (902). The video decoder may determine a palette for the CU (904). To determine the palette, the video decoder may, for a first entry of the palette, choose a predictor sample from a reconstructed neighboring block of the coding unit (906), decode a difference between one or more color values of the first entry and one or more color values of the predictor sample (908), and based on the decoded residue data and the predictor sample, determine the first entry for the palette for the current coding unit (910).

After the video decoder has constructed the palette, which may include multiple iterations of the steps shown in box 904 as well as additional steps not shown in box 904, then the video decoder can use the palette to determine color values for the samples of the CU (912). To use the palette to determine color values for the samples of the CU, the video decoder may perform multiple iterations of the steps of box of 912 as wells additional steps not shown in box 912. As part of using the palette to determine color values for the samples of the CU, the video decoder may, for a sample of the current coding unit, receive an index value, wherein the index value identifies an entry from the palette (914), assign one or more color values associated with the first entry to the sample to determine a reconstructed coding unit (916), and output a picture of decoded video data that includes the reconstructed coding unit (918).

Figure 10:
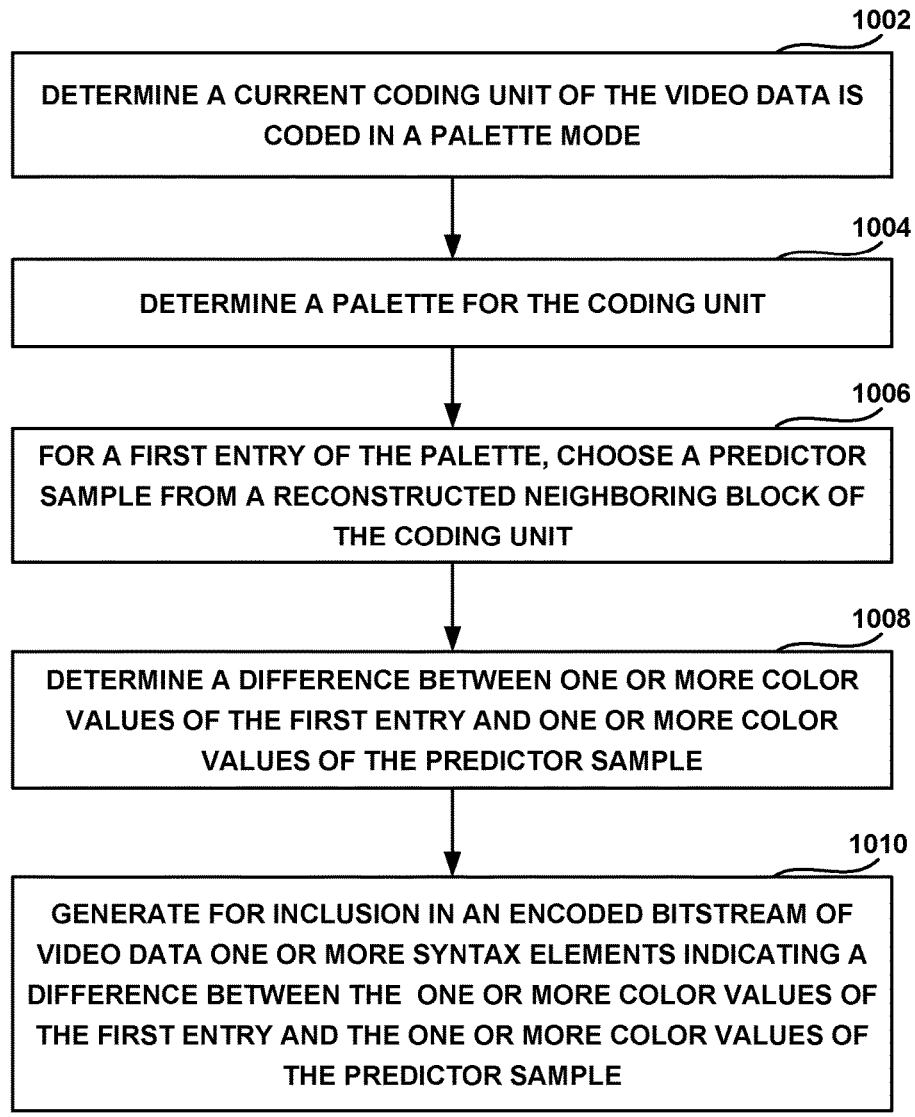
FIG. 10 is a flowchart illustrating techniques of this disclosure.

FIG. 10 is a flowchart illustrating techniques of this disclosure. The techniques of FIG. 10 will be described with respect to a generic video encoder. The generic video encoder may, for example, correspond to video encoder 20 of FIGS. 1 and 6, although the techniques of this disclosure are not limited to any particular type of video decoder. In the example of FIG. 10, the video encoder (e.g., video encoder 20) may determine a current coding unit of the video data is coded in a palette mode (1002). The video encoder may determine a palette for the coding unit (1004). For a first entry of the palette, the video encoder may choose a predictor sample from a reconstructed neighboring block of the coding unit (1006). The video encoder may determine a difference between one or more color values of the first entry and one or more color values of the predictor sample (1008). The video encoder may generate for inclusion in an encoded bitstream of video data one or more syntax elements indicating a difference between the one or more color values of the first entry and the one or more color values of the predictor sample (1010).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a current coding unit of the video data is coded in a palette mode;
    determining a palette for decoding the current coding unit in the palette mode, wherein determining the palette comprises:
        receiving a first flag for a first entry of the palette, wherein a value of the first flag indicates the first entry for the palette is predicted from a predictor sample;
        for the first entry of the palette, determining one or more reconstructed samples in a reconstructed neighboring block of the current coding unit;
        determining one or more color values of the predictor sample based on color values of the one or more reconstructed samples in the reconstructed neighboring block of the current coding unit;
        decoding one or more difference values, wherein the one or more difference values correspond to differences between one or more color values of the first entry and the one or more color values of the predictor sample;
        based on the one or more difference values and the one or more color values of the predictor sample, determining the first entry for the palette for the current coding unit;
        receiving a second flag for a second entry of the palette, wherein a value of the second flag indicates the second entry for the palette is to be determined without using any predictor sample;
    for a sample of the current coding unit, receiving an index value, wherein the index value identifies an entry from the palette;
    assigning one or more color values associated with the entry from the palette to the sample to determine a reconstructed coding unit; and
    outputting a picture of decoded video data comprising the reconstructed coding unit.

2. The method of claim 1, wherein the predictor sample comprises three color components.

3. The method of claim 1, wherein determining the one or more reconstructed samples in the reconstructed neighboring block of the current coding unit comprises locating a sample corresponding to a center position of a row above the current coding unit, and wherein determining the one or more color values of the predictor sample based on the color values of the one or more reconstructed samples comprises using color values of the sample corresponding to the center position of the row above the current coding unit as the one or more color values of the predictor sample.

4. The method of claim 1, wherein determining the palette for the current coding unit further comprises:
in response to receiving the second flag with the value indicating the second entry for the palette is to be determined without using any predictor sample, receiving indications of the color values for the second entry.

5. The method of claim 4, wherein the indications of the color values for the second entry comprise fixed-length coded codewords.

6. The method of claim 1, wherein decoding the one or more difference values comprises decoding the one or more difference values using a Golomb coding process.

7. A method of encoding video data, the method comprising:
determining that a current coding unit of the video data is coded in a palette mode;
determining a palette for encoding the current coding unit in the palette mode, wherein determining the palette comprises:
determining that a first entry for the palette is predicted from a predictor sample;
for a first entry of the palette, determining one or more reconstructed samples in a reconstructed neighboring block of the current coding unit;
determining one or more color values of the predictor sample based on color values of the one or more reconstructed samples in the reconstructed neighboring block of the current coding unit;
determining one or more difference values, wherein the one or more difference values correspond to differences between one or more color values of the first entry and the one or more color values of the predictor sample; and
determining a second entry for the palette is to be determined without using any predictor sample;
generating for inclusion in an encoded bitstream of video data one or more syntax elements indicating the one or more difference values, a first flag for the first entry of the palette, wherein a value of the first flag indicates the first entry for the palette is predicted from the predictor sample, and a second flag for the second entry of the palette, wherein a value of the second flag indicates the second entry for the palette is to be determined without using any predictor sample.

8. The method of claim 7, wherein determining the one or more difference values comprises comparing each color value of the first entry to a corresponding color value of the predictor sample.

9. The method of claim 7, wherein the first entry and the predictor sample each comprise color values for three color components.

10. The method of claim 7, wherein determining the one or more reconstructed samples in the reconstructed neighboring block of the current coding unit comprises locating a sample corresponding to a center position of a row above the current coding unit, and wherein determining the one or more color values of the predictor sample based on the color values of the one or more reconstructed samples comprises using color values of the sample corresponding to the center position of the row above the current coding unit as the one or more color values of the predictor sample.

11. The method of claim 7, further comprising:
encoding the one or more difference values using a Golomb coding process.

12. A device for coding video data, the apparatus comprising:
a memory storing video data; and
one or more processors configured to:
determine that a current coding unit of the video data is coded in a palette mode;
determine a palette for coding the current coding unit in the palette mode, wherein to determine the palette the one more processors are further configured to:
determine that a first entry for the palette is predicted from a predictor sample;
for a first entry of the palette, determine one or more reconstructed samples in a reconstructed neighboring block of the current coding unit;
determine one or more color values of the predictor sample based on color values of the one or more reconstructed samples in the reconstructed neighboring block of the current coding until;
determine a second entry for the palette is to be determined without using any predictor sample; and
code one or more difference values, wherein the one or more difference values correspond to differences between one or more color values of the first entry and the one or more color values of the predictor sample.

13. The device of claim 12, wherein to code the one or more difference values, the one or more processors are configured to encode one or more syntax elements indicative of the differences between the one or more color values of the first entry and the one or more color values of the predictor sample.

14. The device of claim 12, wherein to code the one or more difference values, the one or more processors are configured to:
decode one or more syntax elements indicative of the differences between color values of the first entry and the predictor sample; and
based on the differences between color values of the first entry and the predictor sample, determine the first entry for the palette for the current coding unit.

15. The device of claim 14, wherein the one or more processors are further configured to:
for a sample of the current coding unit, receive an index value, wherein the index value identifies an entry from the palette; and
assign one or more color values associated with the entry from the palette to the sample to determine a reconstructed coding unit.

16. The device of claim 12, wherein the predictor sample comprises three color components.

17. The device of claim 12, wherein to determine the one or more reconstructed samples in the reconstructed neighboring block of the current coding unit, the one or more processors are configured to locate a sample corresponding to a center position of a row above the current coding unit.

18. The device of claim 12, wherein to code the one or more difference values, the one or more processors are further configured to code the one or more difference values using a Golomb coding process.

19. The device of claim 12, wherein the device comprises on or more of:
an integrated circuit;
a microprocessor; or
a wireless communication device comprising the video coder.

20. The device of claim 12, wherein to determine that the first entry for the palette is predicted from the predictor sample, the one or more processors are configured to receive a first flag for the first entry of the palette, wherein a value of the first flag indicates the first entry for the palette is predicted from a predictor sample, and wherein to determine the second entry for the palette is to be determined without using any predictor sample, the one or more processors are configured to receive a second flag for the second entry of the palette, wherein a value of the second flag indicates the second entry for the palette is to be determined without using any predictor sample.

21. The device of claim 12, wherein the one or more processors are further configured to:
  generate for inclusion in an encoded bitstream of video data one or more syntax elements indicating the one or more difference values, a first flag for the first entry of the palette, wherein a value of the first flag indicates the first entry for the palette is predicted from the predictor sample, and a second flag for the second entry of the palette, wherein a value of the second flag indicates the second entry for the palette is to be determined without using any predictor sample.

22. A non-transitory computer readable storage medium storing instructions that when executed by one or more processors cause the one or more processors to:
  determine that a current coding unit of video data is coded in a palette mode;
  determine a palette for coding the current coding unit in the palette mode, wherein to determine the palette for the current coding unit, the computer readable storage medium stores further instructions that when executed by one or more processors cause the one or more processors to:
    determine that a first entry for the palette is predicted from a predictor sample;
    for a first entry of the palette, determine one or more reconstructed samples in a reconstructed neighboring block of the current coding unit;
    determine one or more color values of the predictor sample based on color values of the one or more reconstructed samples in the reconstructed neighboring block of the current coding unit;
    determine a second entry for the palette is to be determined without using any predictor sample; and
    code one or more difference values, wherein the one or more difference values correspond to differences between one or more color values of the first entry and the one or more color values of the predictor sample.

23. The non-transitory computer readable storage medium of claim 22, wherein to code the one or more difference values, the computer readable storage medium stores further instructions that when executed by one or more processors cause the one or more processors to encode one or more syntax elements indicative of the differences between the one or more color values of the first entry and the one or more color values of the predictor sample.

24. The non-transitory computer readable storage medium of claim 22, wherein to code the one or more difference values, the computer readable storage medium stores further instructions that when executed by one or more processors cause the one or more processors to:
  decode one or more syntax elements indicative of the differences between color values of the first entry and the predictor sample; and
  based on the differences between color values of the first entry and the predictor sample, determine the first entry for the palette for the current coding unit.

25. The non-transitory computer readable storage medium of claim 22, storing further instructions that when executed by one or more processors cause the one or more processors to:
  for a sample of the current coding unit, receive an index value, wherein the index value identifies an entry from the palette; and
  assign one or more color values associated with the entry from the palette to the sample to determine a reconstructed coding unit.

26. The non-transitory computer readable storage medium of claim 22, wherein to determine that the first entry for the palette is predicted from the predictor sample, the computer readable storage medium stores further instructions that when executed by one or more processors cause the one or more processors to:
  receive a flag for the first entry of the palette, wherein a first value of the flag indicates the first entry for the palette is predicted from the predictor sample.

27. The non-transitory computer readable storage medium of claim 26, wherein to determine the palette for the current coding unit, the computer readable storage medium stores further instructions that when executed by one or more processors cause the one or more processors to:
  receive a second instance of the flag for a second entry of the palette, wherein a second value for the second instance of the flag indicates the second entry for the palette is not predicted from any predictor sample.

28. The non-transitory computer readable storage medium of claim 22, wherein to code the one or more difference values, the computer readable storage medium stores further instructions that when executed by one or more processors cause the one or more processors to code the one or more difference values using a Golomb coding process.

* * * * *